United States Patent [19]

Sagane

[11] Patent Number: 4,880,873

[45] Date of Patent: Nov. 14, 1989

[54] ADHESIVE FOR CHLORINE-CONTAINING POLYMERS AND AROMATIC GROUP-CONTAINING POLYMERS

[75] Inventor: Toshihiro Sagane, Yamaguchi, Japan

[73] Assignee: Mitsui Petrochemical Industries, Ltd., Tokyo, Japan

[21] Appl. No.: 170,628

[22] Filed: Mar. 17, 1988

Related U.S. Application Data

[63] Continuation of Ser. No. 784,250, Oct. 4, 1985, abandoned.

[30] Foreign Application Priority Data

Oct. 5, 1984 [JP] Japan ................................ 59-207975

[51] Int. Cl.$^4$ .................. C08L 23/26; C08L 23/28; C08L 23/36; C08F 8/00
[52] U.S. Cl. ................................... 525/61; 525/301; 525/309; 525/311; 525/330.3; 525/333.7; 525/359.3; 525/359.4; 525/379; 525/384; 525/386; 526/326
[58] Field of Search ............... 525/61, 386, 311, 359.3, 525/359.4; 526/326

[56] References Cited

U.S. PATENT DOCUMENTS

| | | | |
|---|---|---|---|
| 2,145,345 | 1/1939 | Dreyfus | 525/61 |
| 2,473,996 | 7/1944 | Hanford et al. | 526/326 |
| 2,558,548 | 6/1951 | Eckey | 525/386 |
| 2,801,233 | 7/1957 | Minsk et al. | 525/61 |
| 2,983,696 | 5/1961 | Tocker | 525/61 |
| 3,329,664 | 7/1967 | Tsuda | 525/61 |
| 3,454,446 | 7/1969 | Sakuragi et al. | 428/483 |
| 3,637,394 | 1/1972 | Smith et al. | 525/61 |
| 3,825,523 | 7/1974 | Iwata et al. | 525/231 |
| 3,933,746 | 1/1976 | Steele | 525/61 |
| 3,976,621 | 8/1976 | Pallodino et al. | 525/61 |
| 4,659,785 | 4/1987 | Nagano et al. | 525/324 |

FOREIGN PATENT DOCUMENTS

| | | | |
|---|---|---|---|
| 62-010121 | 1/1987 | Japan | 526/326 |
| 814393 | 6/1959 | United Kingdom | 525/311 |
| 1123725 | 8/1968 | United Kingdom | 526/326 |

*Primary Examiner*—Carman J. Seccuro
*Attorney, Agent, or Firm*—Wenderoth, Lind & Ponack

[57] ABSTRACT

Disclosed is a thermoplastic adhesive comprising a modified polyolefin resin having a branch chain having at least one carbonyl group and at least one benzene nucleus in one side chain. This adhesive shows a strong bonding force to a chlorine-containing polymer or an aromatic group-containing polymer such as a polyester and is especially valuable for the production of a laminate of such a resin and a polyolefin. A blend or block copolymer comprising an olefin resin component that can contain a carboxyl group and a carbon-to-carbon chain resin component having a benzoic acid ester or cinnamic acid ester group in the side chain is especially excellent in the bonding characteristics, particularly the heat-resistance adhesion.

2 Claims, No Drawings

ADHESIVE FOR CHLORINE-CONTAINING POLYMERS AND AROMATIC GROUP-CONTAINING POLYMERS

This application is a continuation of now abanded application Ser. No. 784,250, filed Oct. 4, 1985, now abandoned.

BACKGROUND OF THE INVENTION (1) Field of the Invention

The present invention relates to an adhesive for a chlorine-containing polymer or an aromatic polymer. More particularly, the present invention relates to an adhesive which shows an excellent adhesion capacity when used for laminating a chlorine-containing polymer or aromatic polymer with a polyolefin. Furthermore, the present invention relates to a novel modified olefin resin composition, especially a block copolymer.

(2) Description of the Prior Art

Chlorine-containing polymers such as polyvinyl chloride (PVC) and polyvinylidene chloride (PVDC) and aromatic polymers such as polyethylene terephthalate, polycarbonate, polystyrene and polyphenylene oxide are widely used as food vessels, packaging materials, daily necessaries, micellaneous goods, interior automotive trims, construction materials and industrial materials. When these polymers are used in the fields where chemical resistance, water resistance, warm water resistance and gas barrier property are required, trials are made to laminate these polymers with polyolefins such as polyethylene and polypropylene so as to impart these characteristics.

However, even if a known ordinary adhesive polyolefin such as an epoxy group-containing polyolefin, a carboxyl group-containing polyolefin, an aromatic unsaturated hydrocarbon-grafted polyolefin or a chlorinated polyolefin is used for laminating a polyolefin with a chlorine-containing polymer or aromatic polymer, although a certain adhesion strength can be obtained, further improvement of the adhesion strength is desired. Especially in the field where it is necessary to maintain a adhesion strength in a high-temperature atmosphere (heat-resistant adhesiveness), development of a modified polyolefin having a higher adhesion capacity (higher adhesion strength at normal temperature first of all) than that of the above-mentioned modified polyolefins is desired.

Similarly, when a modified polyolefin as mentioned above is directly laminated on a chlorine-containing polymer or aromatic polymer, further improvement of a adhesion strength is desired.

SUMMARY OF THE INVENTION

I made research with a view to developing an excellent adhesive for a chlorine-containing polymer or aromatic polymer, especially an adhesive capable of showing an excellent adhesion capacity when used for laminating a layer of a chlorine-containing polymer or aromatic polymer with a polyolefin layer. As the result, it was found that when a specific modified polyolefin type polymer having a side chain in which at least one carbonyl group and at least one benzene nucleus exist in one side chain is used as the adhesive, the above object can be attained. I have now completed the present invention based on this finding.

Furthermore, it was found that a composition comprising an olefin resin component which can have a carboxyl group and/or a carboxylic anhydride group and a saturated carbon-to-carbon chain resin component having an aromatic carboxylic acid ester group or benzylidene-acetic acid ester (cinnamic acid ester) group in the side chain is valuable as an adhesive for a chlorine-containing polymer or aromatic polymer and shows a high adhesion capacity, especially a high heat-resistance adhesiveness when used for laminating a layer of a chlorine-containing polymer or aromatic polymer with a polyolefin layer.

It is therefore a primary object of the present invention to provide a novel modified olefin resin composition which is valuable as an adhesive.

Another object of the present invention is to provide a modified olefin resin composition which is valuable as an adhesive for laminating a chlorine-containing polymer or aromatic polymer with a polyolefin.

Still another object of the present invention is to provide a modified olefin resin composition capable of forming a excellent heat resistance adhesion bond between a layer of a chlorine-containing polymer or aromatic polymer and a polyolefin layer.

A further object of the present invention is to provide a process in which a modified olefin resin composition, especially a block copolymer, can be prepared in a high yield at a high efficiency.

More specifically, in accordance with one fundamental aspect of the present invention, there is provided an adhesive for a chlorine-containing polymer or an aromatic polymer, which comprises a modified olefin type polymer having in the side chain thereof at a concentration of 10 to 655 millimoles per 100 g of the polymer a group represented by the following formula:

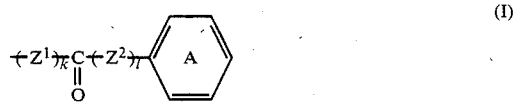

and/or

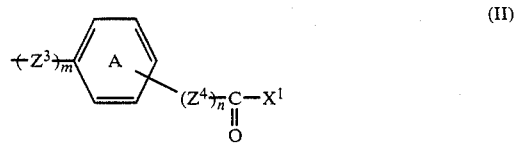

wherein each of k, l, m and n is 0 or 1, $Z^1$, $Z^2$, $Z^3$ and $Z^4$ respectively stand for an oxygen atom or a divalent group comprising at least two elements selected from carbon, hydrogen, nitrogen and oxygen, $X^1$ stands for a monovalent group comprising at least two elements selected from carbon, hydrogen, nitrogen and oxygen, and the benzene ring A may be unsubstituted or substituted.

In accordance with another aspect of the present invention, there is provided a polymer composition comprising (i) a mixture of (A) an olefin resin component which can have a carboxyl group and/or a carboxylic anhydride group and (B) a saturated carbon-to-carbon chain resin component having in the side chain an ester group represented by the following formula:

wherein Ar stands for an aryl or styryl group, (ii) a block copolymer of the components (A) and (B) or (iii)

a combination of the mixture (i) and the block copolymer (ii), wherein the group Ar—COO— is present at a concentration of 10 to 655 millimoles per 100 g of the entire polymer.

In accordance with still another aspect of the present invention, there is provided a process for the preparation of polymer compositions, which comprises mixing a polyolefin having an ethylenically unsaturated carboxylic acid or its anhydride grafted thereto with an olefin resin having an alcoholic hydroxyl group in the side chain under such conditions that at least a partial reaction is caused between the two resins but the alcoholic hydroxyl group is left, and reacting the formed alcoholic hydroxyl group-containing resin composition with an acid halide represented by the following formula:

ArCOX  (IV)

wherein Ar stands for an aryl group or a styryl group, and X stands for a halogen atom.

In accordance with a further aspect of the present invention, there is provided a process for the preparation of modified polyolefin resin compositions, which comprises mixing a polyolefin having an ethylenically unsaturated carboxylic acid or its anhydride grafted thereto, an olefin resin having an alcoholic hydroxyl group in the side chain and an acid anhydride represented by the following formula:

(ArCO)₂O  (V)

wherein Ar stands for an aryl group or a styryl group, under such conditions that at least a partial reaction is caused between the grafted polyolefin and the alcoholic hydroxyl group-containing olefin resin and a reaction is caused between the excessive hydroxyl group and the acid anhydride represented by the formula (V).

In accordance with one more aspect of the present invention, there is provided a process for the preparation of modified polyolefin resin compositions, which comprises mixing a polyolefin having an ethylenically unsaturated carboxylic acid or its anhydride grafted thereto, and a saturated carbon-to-carbon chain resin having both an alcoholic hydroxyl group and an ester group represented by the following formula:

Ar—COO— wherein Ar stands for an aryl or styryl group, for example, a copolymer of alcoholic hydroxyl group containing monomer (vinyl alcohol, 2-hydroxyethyl (meth)acrylate etc.) and Ar—COO— group containing monomer (vinyl benzoate, vinyl cinnamate etc.), under such conditions that at least a partial reaction is caused between both the resins.

DETAILED DESCRIPTION OF THE PREFERRED EMBODIMENTS

The present invention will now be described in detail.

Modified Polyolefin Type Polymer (1) A portion of a modified polyolefin exclusive of a side chain in which at least one carbonyl group and at least one benzene nucleus exist in one side chain (hereinafter referred to as "trunk polymer")

A polyolefin type polymer having a side chain at least one carbonyl group and at least one benzene nucleus exist in one side chain, that is, a modified polyolefin type polymer, used as the adhesive of the present invention is derived from a trunk polymer (A) as the base. As the trunk polymer (A), there can be mentioned homopolymers of α-olefins such as ethylene, propylene, 1-butene, 1-pentene, 1-hexene, 4-methyl-1-pentene, 3-methyl-1-pentene, 1-octene, 1-decene and 1-dodecene, and copolymers of two or more of these α-olefins. The trunk polymer (A) may further comprise at least one comonomer selected from conjugated dienes such as butadiene and isoprene, unconjugated dienes such as 1,4-hexadiene, 1,7-octadiene, dicyclopentadiene, 5-ethylidene-2-norbornene, 5-vinyl-2-norbornene, 5-methylene-2-norbornene and 2,5-norbornadiene, (meth)acrylic acid, (meth)acrylic acid salts, (meth)-acrylic acid esters, maleic anhydride, unsaturated esters such as monomethyl maleate, vinyl acetate and vinyl propionate, unsaturated alcohols such as vinyl alcohol, allyl alcohol, 3-butene-1-ol, 4-pentene-1-ol, 5-hexene-1-ol, 6-heptene-1-ol, 7-octene-1-ol and 10-undecene-1-ol, chlorine-containing vinyl monomers such as vinyl chloride and vinylidene chloride, and aromatic vinyl monomers such as styrene, vinyltoluene, α-methylstyrene and indene.

When the adhesive of the present invention is used for laminating a chlorine-containing polymer or aromatic polymer with a polyolefin, it is preferred that the monomer units constituting the trunk polymer (A) be an α-olefin unit as mentioned above.

The trunk polymer (A) may be linear or branched. When the trunk polymer (A) is composed of at least two kinds of monomer units, these units may be randomly linked or they may be linked in the form of a block copolymer or a graft copolymer or in the form of an alternating copolymer.

(2) A side chain having at least one carbonyl group and at least one benzene nucleus in one side chain (hereinafter referred to as "adhesiveness-imparting side chain")

The side chain (adhesiveness-imparting side chain)

The side chain (adhesiveness-imparting side chain) having at least one carbonyl group and at least one benzene nucleus in one side chain, which is bonded to the trunk polymer (A), is a substituent (branch) having at least one carbonyl group and at least one benzene nucleus in one branch, which should naturally have a molecular weight not lower than 105 (corresponding to the molecular weight of

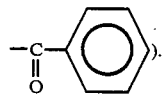

The adhesiveness-imparting side chain may be directly branched from the polymer chain, that is, in the form of a substituent, or may be grafted to the polymer chain in the form of recurring units of a monomer having the above-mentioned substituent.

The carbonyl group present in the adhesiveness-imparting side chain may be in the form of a ketone

an ester

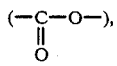

a carboxylic acid

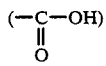

or a carboxylic anhydride

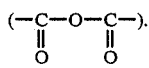

It is preferred that the carbonyl group be present in the form of an ester, a carboxylic acid or a carboxylic anhydride. The benzene nucleus present in the adhesiveness-imparting side chain may be one benzene nucleus (which is inevitably monosubstituted or polysubstituted because the benzene nucleus is linked as the branch) or may comprise at least two independent benzene nuclei connected to each other, such as biphenyl or p-terphenyl. Moreover, the benzene nucleus may be present in the form of a condensed ring such as indene, naphthalene, tetralin, anthracene or phenathrene. The former two types are preferred.

Concerning the substituent or chemical bond which may be present in the adhesiveness-imparting side chain in addition to the carbonyl group and benzene nucleus, there can be mentioned substituents and chemical bonds composed of carbon and hydrogen, such as an alkyl group, an alkylene group, a carbon-to-carbon double bond and a carbon-to-carbon triple bond, substituents and chemical bonds comprising oxygen, nitrogen and sulfur, such as a hydroxyl group, an alkoxyl group, an epoxy group, an ether bond, an isocyanate group, a primary amine, a secondary amine, a tertiary amine, a nitro group and a sulfonic acid group, and halogen atoms such as chlorine and bromine.

(3) Preferred examples of adhesiveness-imparting side chain and process for preparation thereof (i) Case where the adhesiveness-imparting side chain is introduced as the substituent In this case, the adhesiveness-imparting side chain is one represented by the following general formula (I) or (II), in which the benzene nucleus may be substituted with other substituent:

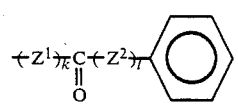

(I)

or

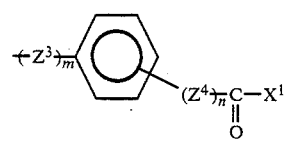

(II)

wherein $Z^1$, $Z^2$, $Z^3$ and $Z^4$ respectively stand for an oxygen atom or a divalent group comprising at least two elements selected from H, C, N and O, $X^1$ stands for a monovalent group comprising at least two elements selected from H, C, N and O, and k, l, m and n are 0 or 1.

It is preferred that in the above formulae (I) and (II) the divalent groups $Z^1$, $Z^2$, $Z^3$ and $Z^4$ be selected from an oxygen atom, an alkylene group, an alkenylene group, an imino group, an alkylene-oxy group, an alkylene-imino group, an alkylene-carbonyl group, an oxyalkylene-oxy group, an oxyalkylene-carbonyl group and a phenylene group, and the monovalent group X be selected from a hydroxyl group, an alkoxyl group, a alkyl group, a phenyl group, a phenylalkyl group and phenylalkenyl group. As preferred examples of $Z^1$ through $Z^4$ in the general formulae (I) and (II), there can be mentioned —O—, —CH=CH—, —CH$_2$—,

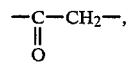

—CH$_2$—CH$_2$, —C≡C—, —CH$_2$—NH—
—O—CH$_2$—, —CH=CH—CH$_2$—, —O—CH$_2$—CH$_2$—, —O—CH$_2$—O—,

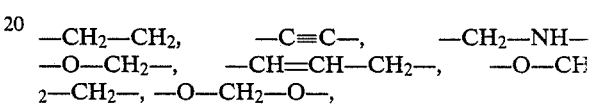

and —O—CH$_2$—CH$_2$—O—NH—.

It is preferred that at least one of k and l be 1 and at least one of m and n be 1. As preferred examples of X there can be mentioned —OH, —OCH$_3$, —OCH$_2$CH$_3$, —C$_6$H$_5$ and —CH=CH—C$_6$H$_5$.

As specific examples of the adhesiveness-imparting side chain corresponding to the general formula (I) or (III), there can be mentioned a benzoic acid ester group

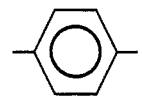

a cinnamic ester group

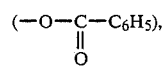

a phenylacetic acid ester group

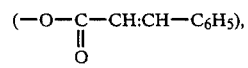

a benzylacetic acid ester group

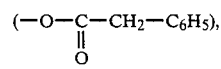

a phenylpropiolic acid ester

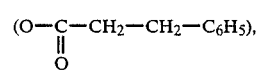

an anilinoacetic acid ester

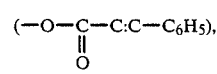

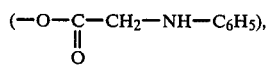

an α-phenylacrylic acid ester

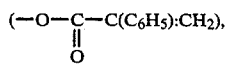

a γ-phenylcrotonic acid ester

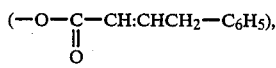

a phenylpyruvic acid ester

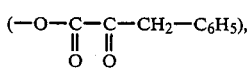

a phenoxyacetic acid ester group

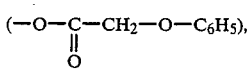

a phenyl ester group

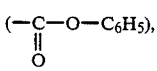

a benzy ester group

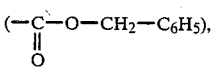

a β-phenylethyl ester group

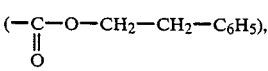

a phenoxymethyl ester group

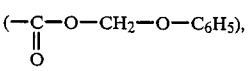

a β-phenoxyethyl ester group

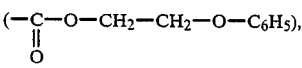

a p-carboxyphenylamide group

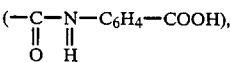

a p-carboxybenzoic acid ester group

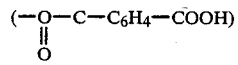

and a p-(β-carboxyvinyl)phenylamide group

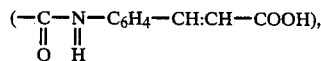

and their derivatives in which other substituent such as an alkyl group, —COOH, —COOCH₃, —COOCH₂CH₃ or —SO₃H is introduced into the benzene nucleus. Of course, the branches of the general formulae (I) and (II) are not limited to those exemplified above.

In the case where the adhesiveness-imparting side chain of the polyolefin type polymer having a side chain having at least one carbonyl group and at least one benzene nucleus is represented by the above-mentioned general formula (I) or (II), the content of the adhesiveness-imparting side chain bonded to the trunk polymer (A) (hereinafter referred to as "branch content") differs according to the kind of the branch, but it is ordinarily preferred that the branch content be at least 50 millimoles, per 100 g of the adhesive. The higher is the branch content, the more improved is the adhesion strength of the adhesive composed of the modified polyolefin type polymer to a chlorine-containing polymer or aromatic polymer, but the melting point (or the softening point) of the adhesive is lowered with increase of the branch content. Accordingly, the upper limit of the branch content is detrermined while taking the melting point of the adhesive or the manufacturing cost of the adhesive into consideration. It is ordinarily preferred that the branch content be up to 655 millimoles, especially up to 500 millimoles, per 100 g of the adhesive composed of the modified polyolefin type polymer.

In the case where the adhesiveness-imparting side chain of the modified polyolefin type polymer having a side chain is represented by the general formula (I) or (II), as the process for the preparation of this modified polyolefin polymer, there can be mentioned, for example, a process in which hydroxyl groups of a copolymer of an α-olefin such as ethylene or propylene and an unsaturated alcohol such as vinyl alcohol, allyl alcohol, 3-butene-1-ol, 4-pentene-1-ol, 5-hexene-1-ol, 6-heptene-1-ol, 7-octene-1-ol or 10-undecene-1-ol are subjected to esterification reaction or ester exchange reaction with a benzene nucleus-containing carboxylic acid, acid chloride, ester or dicarboxylic anhydride, such as benzoic acid, cinnamic acid, benzoyl chloride, cinnamoyl chloride, methyl benzoate, methyl cinnamate, benzoic anhydride or phthalic anhydride. This reaction may be carried out at a temperature of 50° to 300° C. under atmospheric pressure or an elevated pressure of up to 50 atmospheres. A diluent may be used for the reaction. As the diluent, there can be used solvents customarily used for esterification reaction or ester exchange reaction, such as xylene, toluene, benzene, hexane, heptane, kerosene, dimethylformamide and dimethylsulfoxide. When a condensing agent customarily used for esterification reaction or ester exchange reaction, for example, an acid such as sulfuric acid, hydrochloric acid, phosphoric acid or toluene-sulfonic acid, an amine such as pyridine, a metal salt such as an acetate, phosphate or silicate of sodium, magnesium, manganese, zinc, palladium, cadmium, tin or lead, a metal halide such as zinc chloride or antimony trichloride or an alkali metal alcoholate, or a combination of these condensing agents, for example, zinc acetate antimony trifluoride, is used as the catalyst for esterification reaction or ester exchange reaction, the reaction can be carried out at a high efficiency.

In addition to the above-mentioned process, as the process for preparing the modified polyolefin type polymer in which the adhesiveness-imparting side chain is represented by the general formula (I) or (II), there can be mentioned (a) a process in which an α-olefin polymer to which an acid anhydride such as maleic anhydride is grafted is reacted with an amino group-containing compound such as p-aminobenzoic acid or p-aminocinnamic acid at a temperature higher than 100° C. to introduce the carbonyl group to the benznee nucleus-containing compound (ex. p-amine benzoic acid) through the amide linkage, (b) a process in which a carboxyl group of a carboxylic acid group-containing α-olefin polymer such as an ethylene/acrylic acid copolymer or an ethylene/methacrylic acid copolymer is converted to an acid chloride and this acid chloride is reacted with a hydroxyl group-containing aromatic compound such as phenol, cinnamyl alcohol, p-hydroxybenzoic acid or methyl p-hydroxybenzoate to introduce an aromatic group such as a benzoic acid ester group, a cinnamic acid ester group or a derivative thereof to the α-olefin polymer, (c) a process in which an α-olefin/vinyl ester copolymer such as an ethylene/vinyl acetate copolymer is subjected to ester exchange reaction with an aromatic carboxylic acid such as benzoic acid or cinnamic acid or an aromatic ester such as methyl benzoate or methyl cinnamate to introduce a benzoic acid ester group, a cinnamic acid ester group or the like to the α-olefin polymer, (d) a process in which an α-olefin/(meth)acrylic acid ester copolymer such as an ethylene/ethyl acrylate copolymer or an ethylene/ethyl methacrylate copolymer is subjected to ester exchange reaction (alcoholysis reaction) with a hydroxyl group-containing aromatic compound such as phenol, cinnamyl alcohol to introduce a benzoic acid ester group, a cinnamic acid ester group or the like to the α-olefin polymer, (e) a process in which a benzene nucleus of an α-olefin polymer containing an aromatic monomer as one component, such as an ethylene/styrene copolymer or a propylene/styrene copolymer, is subjected to Friedel-Crafts reaction with an acid chloride such as benzoyl chloride, cinnamoyl chloride or acetyl chloride in the presence of a Lewis acid catalyst such as aluminum chloride to introduce an ester group to the above-mentioned benzene nucleus, and (f) a process in which an α-olefin, especially ethylene, is radical-copolymerized with an aromatic group-containing ester type monomer such as vinyl benzoate, vinyl cinnamate or benzyl acrylate.

Of course, processes for preparing the modified polyolefin polymer in which the adhesiveness-imparting side chain is represented by the general formula (I) or (II) are not limited to those exemplified above.

(ii) Case where the adhesiveness-imparting side chain is a branch having recurring monomer units in which at least one carbonyl group and at least one benzene nucleus exist In this case, the adhesiveness-imparting side chain is a branch having recurring monomer units represented by the following general formula (VI) or (VII):

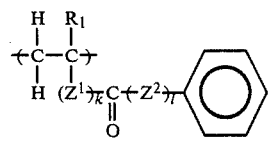

or

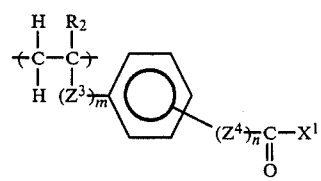

wherein $Z^1$, $Z^2$, $Z^3$, $Z^4$, $Z^1$, k, l, m and n are as defined above, and $R_1$ and $R_2$ stands for a hydrogen atom or a alkyl group having up to 4 carbon atoms, or a branc having recurring monomer units corresponding to ber zene nucleus-substituted derivatives of said recurrin monomer units.

As specific examples of $R_1$ and $R_2$, there can be men tioned —H, —$CH_3$ and —$CH_2CH_3$.

As the process for the preparation of the modifie polyolefin polymer in which the adhesiveness-impar ing side chain has recurring monomer units represente by the general formula (VI) or (VII) or their benzen nucleus substituted derivatives as described in (i) above there can be mentioned a process in which a radica polymerizable monomer as described below is graft copolymerized to the above-mentioned trunk polyme (A). As the radical-polymerizable monomer, there ca be mentioned vinyl esters compounds such as viny benzoate, vinyl cinnamate, vinyl α-phenylcinnamate vinyl β-phenylcinnamate, vinyl phenylacetate, viny benzylacetate, vinyl phenylpropionate, vinyl anilin oacetate, vinyl γ-phenylcrotonate, vinyl phenylpyru vate and vinyl phenoxyacetate, styrene derivatives suc as p-acetoxystyrene, p-benzoyloxystyrene and p-cir namoyloxystyrene, and monofunctional and bifunc tional (meth)acrylic acid ester compounds such a phenyl (meth)acrylate, benzyl (meth)acrylate, β-ber zoyloxyethyl (meth)acrylate, β-cinnamoyloxyeth\ (meth)acrylate, β-phenylethyl (meth)acrylate, phenox ymethyl (meth)acrylate, (meth)acryloyloxyethyl h\ drogenphthalate, β-hydroxyethyl-β'-(meth)acryloylox yethyl phthalate, bisoxyethylene-bisphenol A di(meth )acrylate and bisoxypropylene-bisphenol A di(meth)a crylate. When a polyolefin decomposable by radica reaction, such as polypropylene or poly-1-butene, i used as the base polymer, that is, the trunk polymer (A a bifunctional (meth)acrylic acid esters such as bisox yethylene-bisphenol A di(meth)acrylate are suitabl graft monomers, because reduction of the molecula weight of the product is advantageously controlled.

The benzene nucleus of the compound as mentione above as the radical-polymerizable monomr to be graft polymerized to the trunk polymer (A) may be substi tuted with other substituent, for example, an alk\ group such as —$CH_3$, —$OCH_3$,

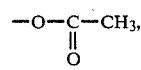

—$C_6H_5$, —COOH, —$COOCH_3$ or —$SO_3H$.

The graft polymer having the above-mentioned compound grafted thereto can be prepared according to known processes. For example, there may be adopted a process in which the trunk polymer (A) is reacted with the above-mentioned monomer in the heated and molten state, or a process in which they are reacted in the solution state. The reaction may be carried out in the presence of a radical initiator according to need. As the radical initiator, there can be mentioned organic peroxides and organic peresters such as benzoyl peroxide, dichlorobenzoyl peroxide, dicumyl peroxide, di-tert-butyl peroxide, 2,5-dimethyl-2,5-di(peroxidobenzoato)-hexene-3, 1,4-bis(tert-butylperoxyisopropyl)benzene, lauroyl peroxide, tert-butyl peracetate, 2,5-dimethyl-2,5-di(tert-butylperoxy)hexene-3, 2,5-dimethyl-2,5-di(-tert-butylperoxy)hexane, tert-butyl perbenzoate, tert-butyl perphenylacetate, tert-butyl perisobutyrate, tert-butyl per-sec-octoate, tert-butyl perpivalate, cumyl perpivalate and tert-butyl perdiethylacetate, and azo compounds such as azobisisobutyronitrile and dimethyl azoisobutyrate. Among these radical initiators, dicumyl peroxide, di-tert-butyl peroxide, 2,5-dimethyl-2,5-di(-tert-butylperoxy)hexyne-3, 2,5-dimethyl-2,5-di(tert-butylperoxy)hexane and 1,4-bis(tert-butylperoxy-isopropyl)benzene are preferred. The reaction temperature is ordinarily 70° to 350° C. and preferably 80° to 320° C.

In the case where the trunk polymer (A) has a carbon-to-carbon double bond in the main chain or side chain or has a chlorine atom bonded to the main chain or side chain, the adhesive of the modified polyolefin polymer of the present invention can be prepared by graft-polymerizing a styrene derivative such as p-acexystyrene, p-benzoyloxystyrene or p-cinnamoyloxystyrene or a vinyl ether derivative such as β-vinyloxyethyl cinnamate or β-vinyloxyethyl benzoate to the trunk polymer (A) in the presence of a cationic polymerization catalyst.

As another preparation process, there can be mentioned (a) a process in which a hydroxyl group-containing monomer such as 2-hydroxyethyl (meth)acrylate or p-hydroxystyrene is graft-polymerized to the trunk polymer (A) and the hydroxyl group of the grafted chain is subjected to esterification reaction or ester exchange reaction with benzoic acid, cinnamic acid or a derivative thereof as described in (3)-(i) above, and (b) a process in which a benzene nucleus-containing monomer such as styrene or p-methylstyrene is graft-polymerized to the trunk polymer (A) and the benzene nucleus of the grafted chain is coupled with benzoyl chloride or the like by Friedel-Crafts reaction as in the process (e) described in (3)-(i) above.

Processes for the preparation of the modified olefin type polymer in which the adhesiveness-imparting side chain is a branch having recurring monomer units represented by the general formula (III) or (IV) or benzene nucleus-substituted derivatives of these recurring monomer units are not limited to the processes exemplified above.

In the case where the adhesiveness-imparting side chain of the modified polyolefin polymer having a side chain having recurring monomer units represented by the general formula (III) or (IV) or benzene nucleus-substituted derivative of these recurring units, the content of the adhesiveness-imparted branch should be in the above-mentioned range, but the content is preferably at least 3% by weight based on the modified polyolefin polymer, though the preferred content differs to some extent according to the kind of the branch. As the content of the adhesiveness-imparting branch is increased, the adhesion strength of the adhesive composed of the modified polyolefin polymer to a chlorine-containing polymer or aromatic polymer is improved but the adhesiveness of the adhesive to a polyolefin is reduced. Accordingly, the upper limit of the adhesiveness-imparting side chain should be determined while taking the compatibility of the adhesive to a polyolefin and the manufacturing cost into consideration. It is ordinarily preferred that the content of the adhesiveness-imparting branch be up to 40% by weight.

(4) Heat-resistance adhesive resin composition and process for preparation thereof An especially preferred polymer composition (suitable for heat-resistance adhesives) of the present invention comprises (A) an olefin resin component which can have a carboxyl group and/or a carboxylic anhydride group and (B) a saturated carbon-to-carbon chain resin component having an aryl carboxylic acid ester group or a styryl carboxylic acid ester group.

The resin component (A) and the resin component (B) may be present in the form of a mixture of both the components, a block copolymer of both the components or a mixture of this block copolymer and both the components. Ordinarily, at least a part of the resin component (A) and at least a part of the resin component (B) are present in the form of a block copolymer.

In this polymer composition, it is preferred that a group represented by the following formula:

Ar—COO—               (III)

wherein Ar stands for an aryl group or a styryl group, be present at a concentrating of 10 to 655 millimoles, especially 70 to 600 millimoles, per 100 g of the polymer composition. If the concentration of the group of the formula (III) is too low and below the above range, the adhesiveness to a chlorine-containing polymer or aromatic polymer is reduced, and if the concentration of the group of the formula (III) is too high and beyond the above-mentioned range, the characteristics of the modified polyolefin, that is, the modified polyolefin has a ordinary polyolefin property, are lost and the adhesiveness to a polyolefine is lost.

In this polymer composition, the carboxyl group and/or the carboxylic anhydride group, derived from the component (A), may be present at a concentration of 0.3 to 95 millimoles, especially 0.3 to 50 millimoles, per 100 g of the polymer composition. In this polymer composition, the carboxyl group and/or the carboxylic anhydride group, in some cases, has a function to promote the adhesiveness of the polymer composition to various substrates. However, if the concentration of the carboxyl group and/or the carboxylic anhydride group exceeds the above-mentioned range, no particular improvement of the adhesiveness can be obtained and the composition becomes disadvantageous from the economical viewpoint.

The olefin resin component (A) may be linear or branched. As the polyolefin component (A), there may be mentioned homopolymers of α-olefins such as ethylene, propylene, 1-butene, 1-pentene, 1-hexene, 4-methyl-1-pentene, 3-methyl-1-pentene, 1-octene, 1-decene and 1-dodecene, and copolymers of two or more of these α-olefins. In addition to the above-mentioned α-olefin component, the polyolefin component (A) may comprise at least one comonomer selected from conjugated dienes such as butadiene and isoprene, unconjugated dienes such as 1,4-hexadiene, 1,7-octadiene, dicyclopentadiene, 5-ethylidene-2-norbornene, 5-vinyl-2-norbornene, 5-methylene-2-norbornene and 2,5-norbonadiene, (meth)acrylic acid, (meth)acrylic acid salts, (meth)acrylic acid esters, maleic anhydride, unsaturated esters such as monomethyl malate, vinyl acetate and vinyl propionate, unsaturated alcohols such as vinyl alcohol, allyl alcohol, 3-butene-1-ol, 4-pentene-1-ol, 5-hexene-1-ol, 6-heptene-1-ol, 7-octene-1-ol and 10-undecene-1-ol, chlorine-containing vinyl monomers such as vinyl chloride and vinylidene chloride, and aromatic vinyl monomers such as styrene, vinyltoluene, α-methylstyrene and indene. It is preferred that the main structure of the olefin resin component (A) be composed mainly of propylene and/or ethylene.

The polyolefin component (A) may be a polymer chain of an α-olefin to which an unsaturated carboxylic acid or a derivative thereof is grafted.

The block copolymer as the preferred polymer composition which is especially suitable for heat-resistance adhesives, of the present invention is prepared by reaction of the hydroxyl group of a polyolefin having an alcoholic hydroxyl group in the side chain as described above with the carboxyl group or carboxylic anhydride group of a polyolefin having a carboxyl group or acid anhydride group in the side chain to form an ester linkage. The carboxyl group or carboxylic anhydride group which has not participated in this reaction can be left in the polyolefin component (A).

As the unsaturated carboxylic acid or its derivative, there can be mentioned unsaturated carboxylic acids such as acrylic acid, maleic acid, fumaric acid, tetrahydrophthalic acid, itaconic acid, citraconic acid and Nadic Acid ® (endocis-bicyclo(2,2,1)hepto-5-ene-2,3-dicarboxylic acid), and derivatives thereof such as acid chlorides, anhydrides and esters, e.g., malenyl chloride, maleic anhydride, citraconic anhydride and monomethyl maleate. Anhydrides are preferred and maleic anhydride and Nadic Anhydride ® are especially preferred.

The unsaturated carboxylic acid or its derivative is grafted to the polyolefin in an amount of 0.2 to 40 g, preferably 0.4 to 10 g, per 100 g of the polyolefin component (A). Of course, when a block copolymer is formed, the amount grafted of the unsaturated carboxylic acid or its derivative may be smaller and below the above-mentioned range.

The number average molecular weight of the polyolefin component (A) is ordinarily 1,000 to 500,000 and preferably 3,000 to 100,000.

It can be said that also the saturated carbon-to-carbon chain resin component (A) has a polyolefin chain. The number average molecular weight of the resin component (B) is ordinarily 500 to 100,000 and preferably 1,000 to 70,000.

In addition to the side chain having a group Ar—COO— group, the polymer component (B) may have other side chain, for example, an alkyl group such as —CH$_3$, —CH$_2$CH$_3$, —CH$_2$CH$_2$CH$_3$ or —CH$_2$CH(CH$_3$)$_2$, an aryl group such as —C$_6$H$_5$ or —C$_6$H$_4$CH$_3$, a halogen atom such as —Cl or —Br, an ester group such as

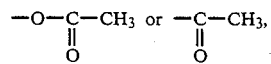

an alcoholic hydroxyl group (—OH). Of course, the side chains are not limited to the groups exemplified above.

In the polyolefin component (B), the group Ar—COO— of the side chain may be bonded to the polyolefin chain (B) directly or through other linkage. As the group Ar—COO—, there can be mentioned, for example, C$_6$H$_5$COO—, C$_6$H$_5$COOCH$_2$CH$_2$OCO—, C$_6$H$_5$CH:CH—COO—, C$_6$H$_5$CH: CH—COOCH$_2$C H$_2$OCO— and HOOC—C$_6$H$_4$—COO—, and derivatives thereof in which other substituent, for example, a alkyl group, —COOCH$_3$, —COOCH$_2$CH$_3$ or —SO$_3$ may be introduced into the benzene nucleus.

The resin component (B) may be a polymer consisting of monomer units of an ethylenically unsaturated monomer having in the side chain an ester group represented by the following formula:

wherein Ar is as defined above, or a copolymer consisting of the above-mentioned monomer units and olefin units, and the latter copolymer is especially preferred.

The olefin resin component (A) and the ester group containing carbon-to-carbon chain resin component (B) may be present at an optional ratio, so far as the concentration of the aryl carboxylic acid ester or styryl carboxylic acid ester units is within the above-mentioned range. Generally, it is preferred that the component (A)/component (B) weight ratio be in the range of from 3/97 to 80/20, especially from 3/97 to 70/30.

As pointed out hereinbefore, in the polymer composition of this type according to the present invention, it preferred that at least a part of the resin component (A) and at least a part of the resin component (B) be present in the form of a block copolymer. Because of the preparation process described hereinafter, this block copolymer has generally a block copolymerization structure in which at least one olefin resin component (A) and at least one ary or styryl carboxylic acid ester group-containing carbon-to-carbon chain resin component (B) to linked together through an ester group. It is most preferred that this block copolymer be a block copolymer having a block copolymerization structure represented by the following formula:

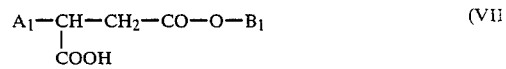

wherein A$_1$ stands for a polymer chain that can have carboxyl group and/or a carboxylic anhydride group in the side chain, and B$_1$ stands for a saturated carbon-to-carbon chain having in the side chain an ester group represented by the following formula:

wherein Ar stands for an aryl group or a styryl group.

The linking structure in the block copolymer is not limited to one described above. The olefin resin component (A) may be directly bonded to the aforesaid ester group-containing carbon-to-carbon chain resin component (B) or they may be bonded through a divalent group such as an ether group, a ketone group, an alkylene group, a phenylene group or a combination thereof.

It is most preferred that the polymer composition of the present invention be composed substantially of a block copolymer. As a preferred example of the block copolymer, there can be mentioned a block copolymer of the above formula (VIII) in which one polyolefin chain $A_1$ is substantially a polypropylene chain and the other polymer chain $B_1$ is substantially an ethylene/vinyl benzoate copolymer chain.

PREPARATION PROCESS I

According to the present invention, a polyolefin to which an ethylenically unsaturated carboxylic acid or its anhydride is grafted and an olefin resin having an alcoholic hydroxyl group in the side chain are mixed under such conditions that at least a partial reaction is caused between them but the alcoholic hydroxyl group is left.

As the grafted polyolefin, there may be used the same polyolefin having an ethylenically unsaturated carboxylic acid or its anhydride grafted thereto, as described hereinbefore with respect to the polyolefin component (A). The amount grafted of the ewthylenically unsaturated carboxylic acid or its anhydride is 0.2 to 40% by weight, preferably 0.4 to 10% by weight, based on the grafted polyolefin.

As the polyolefin having an alcoholic hydroxyl group in the side chain, there can be mentioned an ethylene/vinyl alcohol copolymer, a partially saponified ethylene/vinyl acetate copolymer, polyvinyl alcohol, poly-2-hydroxyethyl (meth)acrylate, an ethylene/2-hydroxyethyl (meth)acrylate copolymer, a styrene/2-hydroxyethyl (meth)acrylate copolymer, a copolymer of an α-olefin such as ethylene or propylene with an unsaturated alcohol such as allyl alcohol, 3-butene-1-ol, 4-pentene-1-ol or 10-undecene-1-ol, and a poly-α-olefin being grafted 2-hydroxyethyl (meth)acrylate grafted thereto. Among these polyolefins, an ethylene/vinyl alcohol copolymer, a partially saponified ethylene/vinyl acetate copolymer and polyvinyl alcohol are preferred.

The reaction between the polyolefin having an alcoholic hydroxyl group in the side chain and the polyolefin having an ethylenically unsaturated carboxylic acid or its anhdyride grafted thereto is carried out at a temperature of 50° to 300° C. under atmospheric pressure or an elevated pressure of up to 50 atmospheres. A diluent such as xylene or toluene may be used for the reaction. An acid such as sulfuric acid or toluene-sulfonic acid may be added as the catalyst. It is especially preferred that the reaction be carried out in the absence of a catalyst in the heat-melted state by using an extruder or the like.

Then, the formed alcoholic hydroxyl group-containing resin composition is reacted with an acid halide represented by the following formula:

ArCOX  (IV)

wherein Ar stands for an aryl group or a styryl group, and X stands for a halogen atom.

The reaction of the second stage is accomplished by dissolving or finely dispersing the alcoholic hydroxyl group-containing resin composition (block copolymer) in an organic solvent such as xylene or toluene and contacting it with ArCOX such as ArCOCl at a temperature of 50° to 250° C. If an amine type catalyst such as pyridine is added, the reaction is advanced at a high efficiency.

PREPARATION PROCESS II

In accordance with another embodiment of the present invention, a polyolefin having an ethylenically unsaturated carboxylic acid or its anhydride grafted thereto, an olefin resin having an alcoholic hydroxyl group in the side chain and an acid anhydride represented by the following formula:

$(ArCO)_2O$  (V)

wherein Ar stands for an aryl group or a styryl group, are mixed under such conditions that at least a partial reaction is caused between the grafted polyolefin and the hydroxyl group-containing olefin resin and reaction is also caused between the excessive hydroxyl group and the acid anhydride represented by the formula (V).

The reaction is performed by preparing a dry blend of the alcoholic hydroxyl group-containing polyolefin, the polyolefin having an unsaturated carboxylic acid or its anhydride grafted thereto and $(ArCO)_2O$ (preferably benzoic anhydride), feeding the dry blend to an extruder or the like and melt-kneading the blend at a temperature of 150° to 300° C.

PREPARATION PROCESS III

In accordance with one more embodiment of the present invention, a carbon-to-carbon chain resin having both an alcoholic hydroxyl group and an ester group represented by the following formula:

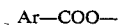

wherein Ar stands for an aryl or styryl group, for example, a copolymer of alcoholic hydroxyl group containing ethylenically unsaturated monomer and Ar—COO— group containing ethylenically unsaturated monomer and a polyolefin having an ethylenically unsaturated carboxylic acid or its anhydride grafted thereto, are mixed under such conditions that at least a partial reaction is caused between the two resins.

The aforesaid copolymer having both an alcoholic hydroxyl group and Ar—COO— group can be synthesized by the bulk or solution copolymerization of alcoholic hydroxyl group containing ethylenically unsaturated monomer, such as 2-hydroxyethyl (meth)acrylate, p-, (m- or o-)hydroxystyrene or p-, (m- or l-)hydroxy-α-methylstyrene, and Ar—COO— group containing ethylenically unsaturated monomer such as vinyl benzoate, vinyl cinnamate or p-, (m- or o-)vinylmethylbenzoate, in the presence or absence of a sovlent using a radical initiator at a temperature of 50° to 180° C.

The reaction (melt-mixing) of the aforesaid copolymer and the polyolefin having an ethylenically unsaturated carboxylic acid or its anhydride grafted thereto is carried out at a temperature of 120° to 300° C. using an extruder or the like.

(5) Physical properties of modified polyolefin polymer

It is preferred that the intrinsic viscosity (η) (measured at 135° C. in decalin as a solvent) of the modified polyolefin polymer used for the adhesive of the present invention be 0.4 to 5 dl/g ($\overline{Mn}$; 1,000 to 500,000), especially 0.7 to 4 dl/g ($\overline{Mn}$: 8,000 to 100,000). The density of the modified polyolefin polymer is ordinarily 0.83 to 0.98 g/cm³ and preferably 0.84 to 0.96 g/cm³. The molecular weight distribution ($\overline{Mw}/\overline{Mn}$) of the modified polyolfin polymer is ordinarily 1 to 25 and preferably 1 to 15. The melt viscosity at 230° C. of the modified polyolefin polymer is preferably $2 \times 10^2$ to $5 \times 10^6$ Poise and especially preferably $5 \times 10^2$ to $8 \times 10^5$ Poise. If the intrinsic viscosity ($\eta$) of the modified polyolefin polymer is higher than 5 dl/g, the melt viscosity of the adhesive composed of the modified polyolfin polymer becomes too high and the adaptability to formation of a laminate is degraded. If the intrinsic viscosity ($\eta$) of the modified polyolefin type polymer is lower than 0.4 dl/g, the melt viscosity becomes too low and molding using an ordinary extruder becomes difficult, and even if molding is forcibly performed, the strength of the adhesive is insufficient and the adhesion strength is reduced.

The branch of the modified polyolefin type polymer used as the adhesive of the present invention includes three types (3)-(i), (3)-(ii) and (3)-(iii) described above. These types may be used singly for constructing the adhesive, or a mixture of two or more of them may be used for constructing the adhesive of the present invention. Incidentally, when the adhesive of the present invention is used for bonding a chlorine-containing polymer or an aromatic polymer, the modified polyolfin type polymer (3)-(i) or (3)-(ii) ordinarily gives better results than the modified polyolefin type polymer (3)-(iii) with respect to the adhesion strength. (Other Components That May Be Added)

The adhesive of the present invention may be composed solely of the above-mentioned modified polyolefin polymer, but a polymeric substance, especially the trunk polymer (A) used as the starting material for the adhesive of the present invention, that is, the starting polyolefin, may be incorporated in the adhesive of the present invention, so far as the adhesion capacity is not degraded. Moreover, additives such as an antioxidant, an ultraviolet absorber, a pigment, a dye, a filler, a nucleating agent, a blocking-preventing agent, a slip agent, an antistatic agent and a flame retardant may be added to the adhesive of the present invention to form an adhesive composition, so far as the adhesion capacity is not degraded.

Furthermore, a homopolymer or copolymer of the monomer used for the grafting reaction described in (3)-(ii) above may be incorporated in the modified polyolefin polymer.

Use of Adhesive of Present Invention

The adhesive of the present invention composed of the above-mentioned modified polyolefin polymer may be used for joining chlorine-containing polymers together, aromatic polymer together or a chlorine-containing polymer to an aromatic polymer. However, it is preferred that the adhesive of the present invention be used for joining a chlorine-containing polymer to a polyolefin or an aromatic polymer to a polyolefin. The adhesive of the present invention may be used in the form of either a hot melt adhesive or a solution type adhesive, but the former type is preferable. The shape of a polymer to which the adhesive of the present invention is applied is not particularly defined, but a sheet or a film may be suitable shape which is bonded by the adhesive in the present invention.

Chlorine-Containing Polymer

As the chlorine-containing polymer, there can be mentioned (co)polymers composed mainly of a chlorinated vinyl monomer, such as polyvinyldiene chloride, polyvinyl chloride, a vinyldiene chloride/vinyl chloride copolymer, a copolymer of vinylidene chloride or vinyl chloride with other unsaturated monomer and polyvinyl chloride having vinyl acetate or other polar monomer grafted thereto, a chlorine-containing rubber such as chloroprene, post-chlorinated polymers such as chlorinated polyethylene, chlorinated polypropylene and chlorinated polystyrene, and chlorinated vinyl monomer-grafted copolymers such as polyethylene having vinylidene chloride and/or vinyl chloride grafted thereto.

These chlorine-containing polymers may be foamed polymers. Among these chlorine-containing polymers, polyvinylidene chloride, polyvinyl chloride, a vinylidene chloride/vinyl chloride copolymer and polar monomer-grafted polyvinyl chloride are preferably bonded by the adhesive of the present invention.

Aromatic Polymer

As the aromatic polymer, there can be mentioned, for example, styrene type resins such as polystyrene, poly-$\alpha$-methylstyrene, a styrene/acrylonitirle copolymer (AS) and a styrene/acrylonitrile/butadiene copolymer (ABS), a romatic polycarbonates such as a polycarbonate of bisphenol A, a polycarbonate of bisphenol F and a polycarbonate of bisphenol AD, polyphenylene oxide resins such as polyphenylene oxide, modified polyphenylene oxide and grafted polyphenylene oxide, and aromatic polyesters such as polyethylene terephthalate, polybutylene terephthalate, polyethylene terephthalate/isophthalate, polyethylene 2,6-naphthalenedicarboxylate, polyphenylene terephthalate, a bisphenol A/terephthalic acid copolycondensate and a bisphenol A/terephthalic acid/isophthalic acid copolycondensate. These aromatic polymers may be foamed polymers.

Polyolefin

As the polyolefin to which the adhesive of the present invention is applied, there can be mentioned homopolymers of a $\alpha$-oleffins such as ethylene, propylene, 1-butene, 1-pentene, 1-hexene, 4-methyl-1-pentene, 3-methyl-1-pentene, 1-octene, 1-decene and 1-dodecene, and copolymers of two or more of these $\alpha$-olefins. These polyolefins may be copolymerized with vinyl monomers such as styrene, vinyl acetate, acrylic acid esters, methacrylic acid esters and acrylic acid metal salts. It is preferred that the crystallization degree of the polyolefin be at least 10%, preferably at least 15%. The intrinsic viscosity ($\eta$) of the polyolfin is ordinarily 0.5 to 5 dl/g ($\overline{Mn}$: 4,000 to 500,000) and preferably 0.7 to 4 dl/g ($\overline{Mn}$: 8,000 to 100,000).

Lamination Method Using Adhesive

As the method for laminating a chlorine-containing polymer or aromatic polymer as described above with polyolefin using the adhesives of the present invention, there can be mentioned, for example, a multi-layer T-die sheet or multi-layer film forming method in which polymers of the respective layers are independently supplied to three extruders and the molten polymers are combined in the interior of one die, and a tandem method in which molten polymers are heat-fusion-bonded outside a die. The thickness of the layer composed of the polyolfin is optional, but the thickness is ordinarily 5$\mu$ to 50 mm and preferably 10$\mu$ to 40 mm. The adhesive of the present invention forms an intermediate adhesive layer and the thickness of this intermediate layer is optional, but the thickness is ordinarily 1 to 500$\mu$ and preferably 2 to 100$\mu$.

Effects of the Present Invention

As shown in the examples given hereinafter, the adhesive of the present invention for a chlorine-containing polymer or aromatic polymer is much excellent over conventional adhesive polyolefins in the adhesion capacity, and the adhesive of the present invention is excellent as an all-purpose adhesive polyolefin capable of bonding to either a chlorine-containing polymer adhered or an aromatic polymer adhered.

The present invention will now be described in detail with reference to the following examples that by no means limit the scope of the invention. Number average molecular weight ($\overline{Mn}$) was measured by GPC method at 135° C., o-dichlorobenzene as a solvent.

EXAMPLE 1

In a reaction vessel having a capacity of 20 l, 1100 g of an ethylene/vinyl alcohol copolymer (saponified ethylene/vinyl acetate copolymer supplied and marketed under the tradename of "Dumilan C-1590" by Takeda Yakuhin) was dissolved in 11 l of p-xylene in a nitrogen atmosphere at 100° C. After the ethylene/vinyl alcohol copolymer had been completely dissolved in p-xylene, 400 ml of pyridine was added into the reaction vessel, and 800 g of benzoyl chloride was continuously supplied in the reaction system over a period of 1 hour. With stirring while maintaining the reaction system at 100° C. Then, reaction was conducted at 100° C. for 1.5 hours after completion of the addition of benzoyl chloride, and the reaction was stopped by adding 2 l of distilled water into the reaction mixture. After termination of the reaction, the temperature was lowered close to room temperature and the liquid reaction mixture was thrown into a great excess of acetone (in a mixer) to precipitate a benzoic acid-esterified ethylene/vinyl alcohol copolymer. The precipitate was recovered by filtration. After filtration, the benzoic acid-esterified ethylene/vinyl alcohol copolymer was washed with acetone repeatedly and dried under reduced pressure at 50° C. for 24 hours to obtain an intended benzoic acid-esterified ethylene/vinyl alcohol copolymer.

From the results of the examination of the infrared absorption spectrum of the product, it was found that the absorption in the vicinity of 3300 cm$^{-1}$, attributed to the starting ethylene/vinyl alcohol copolymer, substantially disappeared but new absorptions appeared at 1600 cm$^{-1}$ and 1580 cm$^{-1}$ (attributed to the benzene nucleus). Even if extraction of the product was conducted with acetone, which is a good solvent for benzoic acid and benzoyl chloride, at the boiling point for 8 hours, the intensities of the absorptions at 1600 cm$^{-1}$ and 1580 cm$^{-1}$ were not reduced at all. When the benzoic acid ester content in the product was measured by the oxygen analysis, it was found that the benzoic acid ester was contained in an amount of 267.3 millimoles per 100 g of the product and the conversion of the hydroxyl group of the starting polymer to the benzoic acid ester group was 92%.

The benzoic acid-esterified ethylene/vinyl alcohol copolymer was molten in one-extruder and was supplied at a resin temperature of 200° C. to a die for forming a three-layer composite T-die sheet. Separately, high density polyethylene (($\eta$)=1.5 dl/g) ($\overline{Mn}$: 21,000) and polyvinylidene chloride (Saran X05253-16 supplied by Dow Chemical) were molten in different extruders and were supplied at a resin temperature of 200° C. to the above-mentioned die. Thus, there was formed a three-layer sheet comprising one outer layer of polyvinylidene chloride (1 mm), the other outer layer of high density polyethylene (50μ) and the intermediate layer of the benzoic acid-esterified ethylene/vinyl alcohol copolymer (20μ). A test piece having a width of 10 mm was cut out from this three-layer sheet, and the polyvinylidene chloride layer was peeled from the esterified polymer layer at a part of the test piece. Then, the two layer film of the high density polyethylene and the esterified polymer was subjected to the 180° peel test at a peeling speed of 50 mm/min and a temperature of 23° C., and the interlaminar adhesion strength per 10 mm of the width was measured between the polyvinylidene chloride and the benzoic acid-esterified ethylene/vinyl alcohol copolymer. It was found that the adhesion strength was 1900 g/cm. Peeling was impossible between the high density polyethylene and the benzoic acid-esterified ethylene/vinyl alcohol copolymer and the two polymers were sufficiently strongly bonded.

Furthermore, a three-layer sheet comprising one outer layer of polyethylene terephthalate (1 mm), the other outer layer of high density polyethylene (50μ) and an intermediate layer of the benzoic acid-esterified ethylene/vinyl alcohol copolymer (20μ) was prepared in the same manner as described above except that polyethylene terephthalate (J-135 supplied Mitsui Pet) was used instead of the polyvinylidene chloride at a resin temperature of 270° C. When the interlaminar adhesion strength between the polyethylene terephthalate layer and the benzoic acid-esterified ethylene/vinyl alcohol copolymer layer was measured in the same manner as described above, it was found that the adhesion strength was 1450 g/cm.

EXAMPLE 2

A cinnamic acid-esterified ethylene/vinyl alcohol copolymer was synthesized in the same manner as described in Example 1 except that 948 g of cinnamoyl chloride (diluted with 1.5 l of tetrachlorocarbon) was used instead of benzoyl chloride used in Example 1. The adhesion strengths of the esterified copolymer to polyvinylidene chloride and polyethylene terephthalate were measured in the same manner as described in Example 1, and it was found that the adhesion strengths were 1750 g/cm and 1300 g/cm, respectively.

EXAMPLES 3 and 4

By using a 15 mm-diameter extruder maintained at 250° C., a blend comprising 50 parts by weight of the benzoic acid-esterified ethylene/vinyl alcohol copolymer synthesized in Example 1 and 50 parts by weight of high-pressure method polyethylene (($\eta$)=1.7 dl/g) ($\overline{Mn}$: 24,000) (Example 3) or polypropylene (($\eta$)=2.. dl/g) ($\overline{Mn}$: 70,000) (Example 4) was prepared.

By using these blends, three-layer sheets were prepared in the same manner as described in Example 1 except that in Example 4, a propylene/ethylene random copolymer (ethylene content=2 mole %, ($\eta$)=2.5 dl/g ($\overline{Mn}$: 39.000) was used as the polyolefin to be laminated with the esterified polymer/polypropylene blend instead of the high density polyethylene used in Example 1, and with respect to the above-mentioned blends, the adhesion strengths to polyvinylidene chloride and polyethylene terephthalate were measured in the same manner as described in Example 1. The obtained results are shown in Table 1.

COMPARATIVE EXAMPLES 1 AND 2

A blend of an ethylene/vinyl acetate copolymer and high-pressure method polyethylene (Comparative Example 1) and a blend of an ethylene/vinyl acetate copolymer and polypropylene (Comparative Example 2) were prepared in the same manner as in Exmaples 3 and 4 except that an ethylene/vinyl acetate copolymer (vinyl acetate content=33% by weight) was used instead of the benzoic acid-esterified ethylene/vinyl alcohol copolymer used in Examples 3 and 4, and with respect to each of these blends, the adhesion strengths to polyvinyldiene chloride and polyethylene terephthalate were measured in the same manner as described in Example 1. Incidentally, in Comparative Example 2, the same propylene/ethylene random copolymer as used in Example 4 was used as the polyolefin to be laminated. The obtained results are shown in Table 1.

introduced and polymerization was carried out for 3 hours. After termination of the polymerization, the catalyst was decomposed by a great excess of methanol and washing was repeated, and the product was dried under reduced pressure overnight at 70° C., whereby 1950 g of a propylene/10-undecene-1-ol copolymer containing 80 millimoles of 10-undecene-1-ol per 100 g of the polymer was obtained.

By using 1100 g of this copolymer, 110 ml of pyridine and 190 g of benzoyl chloride, a benzoic acid-esterified propylene/10-undecene-1-ol copolymer was prepared in the same manner as described in Example 1. From the results of the infrared absorption spectrum analysis and oxygen analysis of the esterified polymer, it was found that 90% of the hydroxyl group of the 10-undecen-1-ol component of the starting polymer was esterified with benzoic acid and the benzoic acid ester content was 71 millimoles per 100 g of the esterified polymer.

The adhesion strengths of the benzoic acid-esterified

TABLE 1

| | Modified Polyolefin Polymer | | | Adhesion Strength[3] (g/cm) | |
|---|---|---|---|---|---|
| Run No. | main component of units of trunk polymer | structure of branch | branch content (millimoles/100 g of polymer) | to polyvinylidene chloride | to polyethylene terephthalate |
| Example 1 | ethylene | 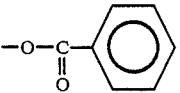 | 267 | 1900 | 1450 |
| Example 2 | " | 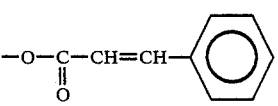 | 247 | 1750 | 1300 |
| Example 3[1] | " | 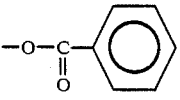 | 134 | 1400 | 1100 |
| Example 4[1] | " | 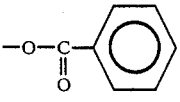 | 124 | 1150 | 1050 |
| Comparative[2] Example 1 | ethylene | 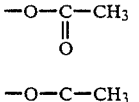 | 192 | 100 | 20 |
| Comparative[2] Example 2 | " | 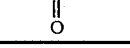 | 192 | 80 | not bonded |

Note
[1] 1/1 blend of benzoic acid-esterified ethylene/vinyl alcohol copolymer and high-pressure method polyethylene (Example 3) or polypropylene (Example 4)
[2] 1/1 blend of ethylene/vinyl acetate copolymer and high-pressure method polyethylene (Comparative Example) or polypropylene (Comparative Example 2)
[3] peeling was impossible between modified polyolefin polymer and polyolefin which was laminated to the modified polyolefin and they were sufficiently strongly bonded each other

EXAMPLE 5

A polymerization vessel having a capacity of 10 l was charged with 4 l of kerosene and the inner atmosphere was substituted with nitrogen, and 3.0 moles of diethylaluminum chloride was added into the polymerization vessel. Then, 3.0 moles of 10-undecen-1-ol was dropped into the polymerization vessel from a dropping funnel over a period of 10 minutes, and reaction was carried out at 70° C. for 30 minutes. Then, 20.0 g of titanium trichloride (Titanium Trichloride AA supplied by Stauffer) was added to the reaction mixture and the temperature was elevated to 85° C., and propylene was propylene/10-undecene-1-ol copolymer to polyvinylidene chloride and polyethylene terephthalate were measured in the same manner as described in Example 1. Incidentally, a propylene/ethylene random copolymer (ethylene content=2 mole %, $(\eta)$=2.5 dl/g) ($\overline{Mn} \approx 78,000$) was used as the polyolfin to be laminated with the esterified polymer instead of the high density polyethylene used in Example 1.

The obtained results are shown in Table 2.

EXAMPLES 6 AND 7

A dry blend of 100 parts by weight of maleic anhydride-grafted high-pressure method low density polyethylene (grafted maleic anhydride content=6.5% by weight) and 11 parts by weight of p-aminobenzoic acid (Example 6) or 12 parts by weight of p-aminocinnamic acid (Example 7) was prepared. Each blend was supplied to a 15 mm-diameter extruder maintained at 250° C. and extruded in a holding time of 2.3 minutes to effect amidation reaction.

When the two reaction products were extracted with acetone, which is a good solvent for p-aminobenzoic acid and p-aminocinnamic acid, at the boiling point for 8 hours and the extraction residues were subjected to the infrared absorption spectrum analysis and the oxygen-nitrogen analysis, it was found that each of p-aminobenzoic acid and p-aminocinnamic acid was substantially quantitatively reacted with maleic anhydride units bonded to the high-pressure method low density polyethylene (namely, benzoic acid or cinnamic acid was secured to the high-pressure method low density polyethylene through the amide linkage). From the results of the oxygen-nitrogen analysis of the polymers purified by the extraction, it was found that the amount of the benzoic acid component secured to 100 g of the benzoic acid-linked high-pressure method low density polyethylene was 60 millimoles (Example 6) and the amount of the cinnamic acid component secured to 100 g of the cinnamic acid-linked high-pressure method low density polyethylene was 59 millimoles (Example 7).

With respect to each of these two polymers, the adhesion strengths to polyvinylidene chloride and polyethylene terephthalate were measured in the same manner as described in Example 1. The obtained results are shown in Table 2.

EXAMPLES 8 AND 9

A propylene/styrene copolymer was prepared by the same method as adopted for the production of the propylene/10-undecen-1-ol in Example 5. Thus, a propylene/styrene copolymer containing 111 millimoles of styrene per 100 g of the copolymer was obtained.

In a reaction vessel having a capacity of 20 l, 1000 g of the propylene/styrene copolymer was dissolved in 10 l of p-xylene in a nitrogen atmosphere at 120° C. After the propylene/styrene copolymer had been completely dissolved in p-xylene, 100 millimoles of ethylaluminum dichloride (as in the form of 100 ml of a solution using an n-decane as a solvent and having a concentration of 1 millimole/ml) and 186.5 g of benzoyl chloride (Example 8) or 104.2 g of acetyl chloride (Example 9) were continuously supplied into the reaction system over a period of 1 hour while maintaining the temperature in the reaction system at 120° C. After completion of the supply of ethylaluminum chloride and the acid chloride, reaction was further conducted at 120° C. for 3 hours. Then, the reaction mixture was cooled to room temperature. By a great excess of methanol, the catayst was decomposed and washing with methanol was repeated, and the product was dried under reduced pressure at 70° C. overnight to obtain propylene/benzoylated styrene copolymer (Example 8) or a propylene/acetylated styrene copolymer (Example 9). From the results of the infrared absorption spectrum analysis and oxygen analysis of the formed polymers, it was found that in Example 8, the benzoyl group was contained in an amount of 81 millimoles per 100 g of the propylene/benzoylated styrene copolymer and in Example 9, the acetyl group was contained in an amount of 95 millimoles per 100 g of the propylene/acetylated styrene copolymer.

With respect to each of the so-obtained two modified polypropylene polymers, the adhesion strengths to polyvinylidene chloride and polyethylene terephthalate were measured in the same manner as described in Example 5. The obtained results are shown in Table 2.

EXAMPLE 10

In a reaction vessel having a capacity of 20 l, 1100 g of an ethylene/ethyl acrylate copolymer (ethyl acrylate content=19% by weight) was dissolved in 11 l of p-xylene in a nitrogen atmosphere at 120° C. After complete dissolution of the ethylene/ethyl acrylate copolymer in p-xylene, 400 g of phenol and 200 ml of concentrated sulfuric acid were added and reaction was conducted with stirring for 4 hours while maintaining the temperature of the reaction system at 120° C. After termination of the reaction, the temperature of the reaction system was lowered close to room temperature and the liquid reaction mixture was thrown into a great excess of acetone (in a mixer), and the precipitated product was recovered by filtration, washed with acetone repeatedly and dried under reduced pressure at 50° C. for 24 hours to obtain an intended phenol-modified ethylene/ethyl acrylate copolymer.

From the results of the infrared absorption spectrum analysis and oxygen analysis, it was found that the product was substantially an ethylene/phenyl acrylate copolymer in which 73% of the ethyl ester group of the starting ethylene/ethyl acrylate copolymer was ester-exchanged with the phenyl ester group. Namely, it was found that the phenyl ester group was contained in an amount of 130 millimoles per 100 g of the copolymer.

With respect to the so-obtained copolymer, the adhesion strengths to polyvinylidene chloride and polyethylene terephthalate were measured in the same manner as described in Example 1. The obtained results are shown in Table 2.

EXAMPLE 11

A dry blend of 100 parts by weight of the ethylene/vinyl alcohol copolymer used in Example 1 and 60 parts by weight of phthalic anhydride was prepared. The blend was supplied to a 15 mm-diameter extruder maintained at 250° C. and was extruded in a holding time of 2.5 minutes to effect esterification reaction.

The melt reaction product was subjected to Soxhlet extraction with acetone, which is a good solvent for phthalic anhydride, at the boiling point for 8 hours, and the extraction residue was subjected to the infrared absorption spectrum analysis and oxygen analysis. It was found that 88% of the hydroxyl group of the starting ethylene/vinyl alcohol copolymer was reacted with phthalic anhydride and converted to an o-carboxybenzoic acid ester group, and that the content of the o-carboxybenzoic acid ester group was 232 millimoles per 100 g of the esterified polymer.

With respect to the so-obtained esterified polymer, the adhesion strengths to polyvinylidene chloride and polyethylene terephthalate were measured in the same manner as described in Example 1. The obtained results are shown in Table 2.

TABLE 2

| Run No. | Modified Polyolefin Polymer | | | Adhesion Strength[1] (g/cm) | |
|---|---|---|---|---|---|
| | main component of units of trunk polymer | structure of branch | branch content (millimoles/100 g of polymer) | to polyvinylidene chloride | to polyethylene terephthalate |
| Example 5 | propylene | —(CH$_2$)$_{11}$O—C(=O)—C$_6$H$_5$ | 71 | 1200 | 1200 |
| Example 6 | ethylene | —CH(COOH)—CH$_2$—C(=O)—N(H)—C$_6$H$_4$—COOH | 60 | 1100 | 1000 |
| Example 7 | ethylene | —CH(COOH)—CH$_2$—C(=O)—N(H)—C$_6$H$_4$—CH=CH—COOH | 59 | 1050 | 950 |
| Example 8 | propylene | —C$_6$H$_4$—C(=O)—C$_6$H$_5$ | 81 | 1200 | 1150 |
| Example 9 | propylene | —C$_6$H$_4$—C(=O)—CH$_3$ | 95 | 1350 | 1300 |
| Example 10 | ethylene | —C(=O)—C$_6$H$_5$ | 130 | 1450 | 1200 |
| Example 11 | ethylene | —O—C(=O)—C$_6$H$_4$—COOH | 232 | peeling impossible | 1600 |

Note
[1] peeling was impossible between modified polyolefin polymer and polyolefin which was laminated to the modified polyolefin and they were sufficiently strongly bonded each other

EXAMPLE 12

In a pressure vessel, 1500 g of an ethylene/vinyl acetate copolymer (vinyl acetate content=2.0 mole %, crystallization degree=52%) was dissolved in 7.5 l of p-xylene in a nitrogen atmosphere at 160° C. Then, while maintaining the temperature in the reaction system at 160° C., vinyl benzoate and 500 ml of dicumyl peroxide solution in p-xylene (0.2 g of dicumyl peroxide in 10 ml) were continuously fed into the vessel over a period of 4 hours using two different conduits respectively, so that finally, 800 g of vinyl benzoate and 10.0 g of dicumyl peroxide were fed to the system. Then, reaction was conducted at 160° C. for 2 hours, and after termination of the reaction, the reaction mixture was cooled close to room temperature and was thrown into a great excess of acetone to precipitate a vinyl benzoate-grafted ethylene/vinyl acetate copolymer. The precipitated grafted copolymer was recovered by filtration, washed with acetone repeatedly and dried under reduced pressure at 50° C. for 15 hours to obtain an intended vinyl benzoate-grafted ethylene/vinyl acetate copolymer. From the results of the infrared absorption spectrum analysis and oxygen analysis of the graft polymer, it was found that the content of grafted vinyl benzoate in the graft polymer was 4.3% by weight.

With respect to the so-obtained vinyl benzoate-grafted ethylene/vinyl acetate copolymer, the adhesion strengths to polyvinylidene chloride and polyethylene terephthalate were measured in the same manner as described in Example 1. The obtained results are shown in Table 3. Incidentally, peeling was impossible between the graft polymer and high density polyethylene and they were sufficiently strongly bonded.

EXAMPLES 13 THROUGH 19

Various graft polymers were prepared in the same manner as described in Example 12 except that monomers shown in Table 3 were used as the monomer to be grafted to the ethylene/vinyl acetate copolymer instead of vinyl benzoate. The adhesion strengths to polyvinylidene chloride and polyethylene terephthalate were measured in the same manner as described in Example 1. The obtained results are shown in Table 3.

TABLE 3

| Run No. | Monomer-Grafted Ethylene/Vinyl Acetate Copolymer | | Adhesion Strength[1] (g/cm) | |
|---|---|---|---|---|
| | grafted monomer | grafted amount (% by weight) | to polyvinylidene chloride | to polyethylene terephthalate |
| Example 12 | vinyl benzoate | 4.3 | 1850 | 1300 |
| Example 13 | vinyl cinnamate | 1.7 | 1050 | 1000 |
| Example 14 | benzyl acrylate | 5.4 | 1700 | 1600 |
| Example 15 | benzyl methacrylate | 1.9 | 950 | 1050 |
| Example 16 | phenoxyethyl acrylate | 5.7 | 1750 | 1500 |
| Example 17 | acryloyloxyethyl hydrogenphthalate | 7.3 | 1600 | 1450 |
| Example 18 | β-hydroxyethyl-β'-acryloyloxyethyl phthalate | 7.0 | 1200 | 1150 |
| Example 19 | β-hydroxy-γ-phenoxypropyl acrylate | 6.6 | 1550 | 1450 |

Note
[1] peeling was impossible between each monomer-grafted ethylene/vinyl acetate copolymer and high density polyethylene which was laminated to the copolymer and they were sufficiently strongly bonded each other

EXAMPLES 20 THROUGH 23

Various vinyl benzoate-grafted ethylene type polymers were synthesized in the same manner as described in Example 12 except that polymers shown in Table 4 were used as the base polyolefin (trunk polymer (A)) instead of the ethylene/vinyl acetate copolymer using in Example 12. The adhesion strengths were measured in the same manner as described in Example 1. The obtained results are shown in Table 4.

EXAMPLES 24 THROUGH 26

Various vinyl benzoate-grafted propylene type polymers were synthesized in the same manner as described in Example 12 except that propylene type polymers shown in Table 4 were used as the base polyolefin (trunk polymer (A)) instead of the ethylene/vinyl acetate copolymer using in Example 12. The adhesion strengths were measured in the same manner as described in Example 1 except that a propylene/ethylene random copolymer (ethylene content=2 mole %) was used as the polyolefin to be laminated with the graft polymer. The obtained results are shown in Table 4.

Peeling was impossible between each of the vinyl benzoate-grafted propylene type of polymers and the propylene/ethylene random polymer, and they were sufficiently strongly bonded.

EXAMPLE 27

Vinyl benzoate-grafted polybutene-1 was synthesized in the same manner as described in Example 12 except that polybutene-1 was used as the base polyolefin (trunk polymer (A)) instead of the ethylene/vinyl acetate copolymer. The adhesion strengths were measured in the same manner as described in Example 1 except that polybutene-1 $((\eta)=3.0$ dl/g) $\overline{Mn}=360,000$ was used as the polyolefin to be laminated with the graft polymer. The obtained results are shown in Table 4.

EXAMPLE 28

Vinyl benzoate-grafted poly-4-methylpentene-1 was synthesized in the same manner as described in Example 12 except that poly-4-methylpentene-1 was used as the base polyolefin (trunk polymer (A)) instead of the ethylene/vinyl acetate copolymer. A three-layer sheet was prepared in the same manner as described in Example 1 except that a 4-methylpentene-1 (98 mole %)/decene-1 (2 mole %) copolymer $((\eta)=2.5$ dl/g $\overline{Mn}=75,000$ was used as the polyolefin to be laminated with the graft polymer and the temperature at which the graft polymer and the 4-methylpentene-1/decene-1 copolymer were supplied to the die was changed to 260° C. The adhesion strengths were measured in the same manner as described in Example 1. The obtained results are shown in Table 4.

TABLE 4

| | Vinyl Benzoate-Grafted Polyolefin | | | |
|---|---|---|---|---|
| | | amount (% by weight) | Adhesion Strength[1] (g/cm) | |
| Run No. | base polyolefin (trunk polymer (A)) (composition: mole %) | of grafted vinyl benzoate | to polyvinylidene chloride | to polyethylene terephthalate |
| Example 20 | ethylene(80)/propylene(20) copolymer | 3.0 | 1550 | 1200 |
| Example 21 | ethylene(90)/butene-1(10) copolymer | 2.9 | 1600 | 1100 |
| Example 22 | ethylene(97)/4-methylpenten-1(3) copolymer | 2.7 | 1350 | 1050 |
| Example 23 | high-pressure method polyethylene | 2.4 | 1700 | 1450 |
| Example 24 | polypropylene | 1.7 | 850 | 600 |
| Example 25 | propylene(70)/butene-1(30) copolymer | 1.5 | 1650 | 1700 |
| Example 26 | propylene(65)/ethylene(35) copolymer | 1.7 | 1400 | 1350 |
| Example 27 | polybutene-1 | 2.0 | 1350 | 1500 |
| Example 28 | poly-4-methylpentene-1 | 2.2 | 800 | 650 |

Note
[1] peeling was impossible between each vinyl benzoate-grafted polyolefin and laminated polyolefin and they were sufficiently strongly bonded.

EXAMPLE 29

In a Henschel mixer, 100 parts by weight of the ethylene/vinyl acetate copolymer used in Example 1 was sufficiently mixed with 20 parts by weight of vinyl benzoate and 0.3 part by weight of 2,5-dimethyl-2,5-di(tert-butylperoxy)hexyne-3 to impregnate the copolymer with vinyl benzoate and the peroxide, and the mix ture was fed to a 15 mm-diameter extruder (maintained at 200° C.) and was kneaded and extruded in a holding time of 2.3 minutes. The obtained vinyl benzoate-grafted ethylene/vinyl acetate copolymer was dissolved in p-xylene (125° C.), and in the same manner as described in Example 12, the vinyl benzoate-grafted ethylene/vinyl acetate copolymer was precipitated, recovered by filtration and dried. The amount of grafted vinyl benzoate in the graft copolymer was 12% by weight.

A three-layer laminate sheet was prepared in the same manner as described in Example 1 except that the so-obtained vinyl benzoate-grafted ethylene/vinyl acetate copolymer was used, and the adhesion strengths were determined in the same manner as described in Example 1. It was found that the adhesion strength of the copolymer to polyvinyldiene chloride was 1800 g/cm and to polyethylene terephthalate was 1750 g/cm. Incidentally, peeling was impossible between the vinyl benzoate-grafted ethylene/vinyl acetate copolymer and the laminated high density polyethlene and they were sufficiently strongly bonded each other.

EXAMPLE 30

In a Henschel mixer, 100 parts by weight of polypropylene was sufficiently mixed with 20 parts by weight of bisoxypropylene-modified bisphenol A diacrylate (BP-2PA supplied by Kyoeisha Yushi) and 0.1 part by weight of 2,5-dimethyl-2,5-di(tert-butylperoxy)hexyne-3 to impregnate or cover polypropylene with the diacrylate monomer and the peroxide, and the mixture was fed to a 15 mm-diameter extruder (maintained at 250° C.) and was kneaded and extruded in a holding time of 2.0 minutes. The obtained crude diacrylate monomer-grafted polypropylene was dissolved in p-xylene (160° C.), and the solution was cooled to room temperature and thrown into a great excess of methylethyl ketone. The precipitated graft polymer was recovered by filtration, washed with methylethyl ketone, filtered and dried under reduced pressure at 50° C. for 15 hours. From the results of the infrared absorption spectrum analysis and oxygen analysis of the graft polymer, it was found that the diacrylate monomer was grafted in an amount of 12.5% by weight in the graft polymer.

The adhesion strengths of the so-obtained crude product of bisoxypropylene-modified bisphenol A diacrylate-grafted polypropylene were measured in the same manner as in Examples 24 through 26. It was found that the adhesion strength of the product to polyvinylidene chloride was 950 g/cm and to polyethylene terephthalate was 800 g/cm. Incidentally, peeling was impossible between the diacrylate monomer-grafted polypropylene and the laminated propylene/ethylene random copolymer and they were sufficiently strongly bonded each other.

EXAMPLES 31 THROUGH 40

The adhesion strengths of the benzoic acid-esterified ethylene/vinyl alcohol copolymer and high-pressure method polyethylene blend (1/1) used in Example 3 and the vinyl benzoate-grafted ethylene/vinyl acetate copolymer used in Example 12 were measured in the same manner as described in Example 1 except that polyvinyl chloride (Vinyclon 4000-H supplied by Mitsui Toatsu Kagaku) or a vinyl chloride/vinyl acetate copolymer (Nipolite MH supplied by Chisso; vinyl acetate content =5% by weight) was used as the chlorine-containing polymer instead of polyvinylidene chloride and the resin temperature was changed to 200° or 220° C. respectively. The obtained results are shown in Table 5 (Examples 31 through 34).

The adhesion strengths of the above-mentioned two modified polyolefin type polymers were measured in the same manner as described in Example 1 except that polycarbonate (panlite L-1250 supplied by Teijin), grafted polyphenylene oxide (Xylon 300V supplied by Asahi-Dow) or polystyrene (Topolex GP-500-51 supplied by Mitsui Toatsu Kagaku Kogyo) was used as the aromatic polymer instead of polyethylene terephthalate and the resin temperature was changed to 280°, 320° or 200° C. respectively. The obtained results are shown in Table 5 (Examples 35 through 40).

TABLE 5

|  | benzoic acid-esterified ethylene/vinyl alcohol/high-pressure method polyethylene blend (g/cm) | vinyl benzoate-grafted ethylene/vinyl acetate copolymer (g/cm) |
|---|---|---|
| to polyvinyl chloride | (Example 31) 1300 | (Example 32) 1800 |
| to vinyl chloride/vinyl acetate copolymer | (Example 33) 1200 | (Example 34) 1750 |
| to polycarbonate | (Example 35) 1150 | (Example 36) 1700 |
| to polyphenylene oxide | (Example 37) 1050 | (Example 38) 1250 |
| to polystyrene | (Example 34) 900 | (Example 40) 950 |

Note
peeling was impossible between modified polyolefin type polymer and the laminated high density polyethylene and they were sufficiently strongly bonded The experiments described hereinafter, Examples and Comparative Examples are used for showing the predominance in heat-resistance adhesiveness (at 80° C.) of the polymer composition comprising a mixture of (A) an olefin resin component which can have a carboxy group and/or carboxylic anhydride group and (B) a carbon-to-carbon chain resin component having in the side chain the aforesaid Ar—COO— group, (ii) a block copolymer of the components (A) and (B) or (iii) a combination of the mixture (i) and the block copolymer (ii). And so, a modified polyolefin or its composition used hereinbefore as an Example will be used Comparative Example later, to show the predominance in heat-resistance adhesiveness of the Examples which will be shown hereinafter.

EXAMPLE 41

A dry blend of 90 parts by weight of an ethylene/vinyl alcohol copolymer (Eval® EP-E105 supplied by Kuraray; ethylene/vinyl alcohol molar ratio=44/56) and 10 parts by weight of maleic anhydride-grafted polypropylene (grafted maleic anhydride content=3.0% by weight, $(\eta)$=0.50 as determined in decalin at 135° C. $\overline{Mn}$=11,000) was prepared. The dry blend was fed to a 15 mm-diameter extruder maintained at 200° C. and was melted and kneaded for a holding time of about 4 minutes to obtain a compression containing a blcok copolymer having the (ethylene/vinyl alcohol copolymer)-(maleic anhydride-grafted polypropylene) structure.

In the infrared absorption spectrum of the so-obtained composition containing the block copolymer, the decrease of the absorption intensity of the attributed to the carbonyl group of the maleic anhydride group (1860 and 1780 cm$^{-1}$) was determined in comparison with that of the starting maleic anhydride-grafted polypropylene. From this decrease ratio of the absorption intensity, it was confirmed that 70% of the maleic anhydride group of the starting maleic anhydride-grafted polypropylene was reacted and linked with the hydroxyl group of the ethylene/vinyl alcohol copolymer.

Then, the composition containing the block copolymer was pulverized to an average particle size of 200 μm by a pulverizer to obtain a powder of the block copolymer-containing composition.

In a reaction vessel having a capacity of 20 l, 500 g of the powder of the composition containing the block copolymer consisting of the ethylene/vinyl alcohol copolymer and the maleic anhydride-grafted polypropylene was dispersed in 5 l of p-xylene at 120° C. in a nitrogen atmosphere (the powder was not dissolved in p-xylene under the above conditions). Then, 1000 g of pyridine was added into the reaction vessel, and 1900 g of benzoyl chloride was continuously supplied into the reaction system with stirring over a period of 2 hours while maintaining the temperature in the reaction system at 120° C. After completion of the supply of benzoyl chloride, reaction was further conducted at 120° C. for 2 hours, and 4 l of distilled water was added to the reaction mixture to stop the reaction. After termination of the reaction, the liquid reaction mixture was cooled close to room temperature and thrown into a great excess of methanol (in a mixer) to precipitate the intended block copolymer-containing composition. The precipitated block copolymer-containing composition was recovered by filtration, washed with methanol repeatedly and dried under reduced pressure at 50° C. for 24 hours to obtain the intended product.

When the infrared absorption spectrum of the product was examined, it was found that the absorption of the starting composition containing the block copolymer consisting of the ethylene/vinyl alcohol copolymer and the maleic anhydride-grafted polypropylene at about 3300 cm$^{-1}$ (attributed to the alcoholic hydroxyl group) substantially disappeared and new absorptions appeared at 1600 cm$^{-1}$ and 1580 cm$^{-1}$ (attributed to the benzene nucleus). Even if the product was extracted with methanol, which is a good solvent for benzoic acid and benzoyl chloride, at the boiling point for 8 hours, the intensities of the absorptions at 1600 cm$^{-1}$ and 1580 cm$^{-1}$ were not reduced at all. From the results of the oxygen analysis, it was found that the benzoic acid ester content was 559 millimoles per 100 g of the product, and it was confirmed that the covnersion of the hydroxyl group in the starting composition containing the block copolymer consisting of the ethylene/vinyl alcohol copolymer and the maleic anhydride-grafted polypropylene to the benzoic acid ester group was 98%.

The benzoic acid-esterified polymer composition was molten in one extruder and was supplied at a resin temperature of 200° C. to a die for forming a three-layer composite T-die sheet. Separately, a propylene/ethylene random copolymer (ethylene content = 2 mole %, ($\eta$) = 2.5 dl/g) and polyvinylidene chloride (Saran X05253-16 supplied by Dow Chemical) were molten in different extruders and were supplied at a resin temperature of 200° C. to the above-mentioned die. Thus, there was formed a three-layer sheet comprising one outer layer of polyvinylidene chloride (1 mm), the other outer layer of the propylene/ethylene random polymer (50 μ) and the intermediate layer of the benzoic acid-esterified polymer composition (20 μ). A test piece having a width of 10 mm was cut out from this three-layer sheet, and the polyvinylidene chloride layer was peeled from the esterified polymer composition layer at a part of the test piece. Then, the two-layer film of the propylene/ethylene random copolymer and the esterified polymer composition was subjected to the 180° peel test at a peeling speed of 50 mm/min and temperatures of 23° C. and 80° C. and the interlaminar adhesion strength per 10 mm of the width was measured between the polyvinylidene chloride and the benzoic acid-esterified polymer composition. The obtained results are shown in Table 6. Peeling was impossible between the propylene/ethylene random copolymer and the benzoic acid-esterified polymer composition and the two polymers were sufficiently strongly bonded.

Furthermore, a three-layer sheet comprising one outer layer of polyethylene terephthalate (1 mm), the other outer layer of the propylene/ethylene random copolymer (50 μ) and an intermediate layer of the benzoic acid-esterified polymer composition (20 μ) was prepared in the same manner as described above except that polyethylene terephthalate (J-135 supplied Mitsui Pet) was used instead of the polyvinylidene chloride. The interlaminar adhesion strength between the polyethylene terephthalate layer and the benzoic acid-esterified polymer composition layer was measured in the same manner as described above. The obtained results are shown in Table 6.

Incidentally, in the examples and comparative examples given hereinafter, the adhesion, strengths were detrermined in the same manner as in Example 41.

EXAMPLES 42 THROUGH 44

The benzoic acid-esterified polymer composition synthesized in Example 41 was diluted with polymers shown in Table 6 at weight ratios shown in Table 6 to form blends (kneading was carried out in a 15 mm-diameter extruder at 200° C.).

The properties and adhesion strengths of the blends are shown in Table 6.

EXAMPLE 45

A composition comprising a block copolymer consisting of an ethylene/vinyl alcohol copolymer and maleic anhydride-grafted polypropylene was prepared in the same manner as described in Example 41 except that instead of the ethylene/vinyl alcohol copolymer used in Example 41, an ethylene/vinyl alcohol copolymer having a lower alcoholic hydroxyl group content (saponified ethylene/vinyl acetate copolymer supplied and marketed under the tradename "Dumilan C-1590"; ethylene/vinyl acetate copolymerization molar ratio = 86/12/1) was used.

In a reaction vessel having a capacity of 20 l, 1100 g of the so-obtained block copolymer-containing composition was dissolved in 11 l of p-xylene in a nitrogen atmosphere at 100° C. After the composition had been completely dissolved in p-xylene, 400 ml of pyridine was added into the reaction vessel, and 800 g of benzoyl chloride was continuously supplied in the reaction system over a period of 1 hour. Then, reaction was conducted at 100° C. for 1.5 hours after completion of the addition of benzoyl chloride, and the reaction was stopped by adding 2 l of distilled water into the reaction mixture. After termination of the reaction, the temperature was lowered close to room temperature and the liquid reaction mixture was thrown into a great excess of methanol (in a mixer) to precipitate a benzoic acid-esterified polymer composition. The precipitate was recovered by filtration. After filtration, the benzoic acid-esterified polymer composition was washed with methanol repeatedly and dried under reduced pressure at 50° C. for 24 hours to obtain an intended benzoic acid-esterified polymer composition.

The benzoic acid ester content in the composition was 263 millimoles/100 g. The properties and the adhesion strengths are shown in Table 6.

EXAMPLE 46

The benzoic acid-esterified polymer composition was diluted as shown in Table 6 to form a blend (kneading was carried out in a 15 mm-diameter extruder at 200° C.).

The properties and adhesion strenghts of the blend are shown in Table 6.

COMPARATIVE EXAMPLE 3

In a reaction vessel having a capacity of 20 l, 1100 g of an ethylene/vinyl alcohol copolymer (saponified ethylene/vinyl acetate copolymer supplied and marketed under the tradename of "Dumilan C-1590" by Takeda Yakuhin) was dissolved in 11 l of p-xylene in a nitrogen atmosphere at 100° C. After the ethylene/vinyl alcohol copolymer had been completely dissolved in p-xylene, 400 ml of pyridine was added into the reaction vessel, and 800 g of benzoyl chloride was continuously supplied in the reaction system over a period of 1 hour. Then, reaction was conducted at 100° C. for 1.5 hours after completion of the addition of benzoyl chloride, and the reaction was stopped by adding 2 l of distilled water into the reaction mixture. After termination of the reaction, the temperature was lowered close to room temperature and the liquid reaction mixture was thrown into a great excess of methanol (in a mixer) to precipitate a benzoic acid-esterified ethylene/vinyl alcohol copolymer. The precipitate was recovered by filtration. After filtration, the benzoic acid-esterified ethylene/vinyl alcohol copolymer was washed with methanol repeatedly and dried under reduced pressure at 50° C. for 24 hours to obtain an intended benzoic acid-esterified ethylene/vinyl alcohol copolymer.

The properties and adhesion strengths of the product are shown in Table 6.

COMPARATIVE EXAMPLE 4

The copolymer used in Comparative Example 3 was diluted as shown in Table 6 to form a blend (kneading was carried out in a 15 mm-diameter extruder at 200° C.).

The properties and adhesion strengths of the blend are shown in Table 6.

TABLE 6

| Run No. | structure of polymer chain(A) | structure of polymer chain(B) | (A)/(B) weight ratio | Ar—COO— group content (millimoles per 100 g of (C)) | preparation process (see the text) | Polymer ((D)) Used for Dilution of (C) (molar ratio) |
|---|---|---|---|---|---|---|
| Example 41 | $-(CH_2-CH)-$ $\quad\quad\;\; |$ $\quad\quad\;\; CH_3$ | $-(CH_2-CH_2)-(CH_2-CH)-$ $\quad\quad\quad\quad\quad\quad\quad\;\; |$ $\quad\quad\quad\quad\quad\quad\quad\;\; O$ $\quad\quad\quad\quad\quad\quad\quad\;\; |$ $\quad\quad\quad\quad\quad\quad\quad\;\; C=O$ $\quad\quad\quad\quad\quad\quad\quad\;\; |$ $\quad\quad\quad\quad\quad\quad\quad\;\; C_6H_5$ | 4.2/95.8 | 559 | (I) | not diluted |
| Example 42 | " | " | 4.2/95.8 | 559 | (I) | polypropylene |
| Example 43 | " | " | 4.2/95.8 | 559 | (I) | " |
| Example 44 | " | " | 4.2/95.8 | 559 | (I) | propylene(70)/butene-1(30) copolymer |
| Example 45 | " | $-(CH_2-CH_2)-(CH_2-CH)-(CH_2-CH)-$ with acetate (C=O–CH_3) and benzoate (C=O–C_6H_5) substituents | 7.3/92.7 | 263 | (I) | not diluted |
| Example 46 | " | " | 7.3/92.7 | 263 | (I) | propylene(70)/butene-1(30) copolymer |

TABLE 6-continued

| | | | | | | |
|---|---|---|---|---|---|---|
| Comparative Example 3 | not present | -(CH₂—CH₂)(CH₂—CH)(CH₂—CH)- with O-C(=O)-CH₃ and O-C(=O)-phenyl side groups | 0/100 | 267 | (I) | not diluted |
| Comparative Example 4 | not present | " | 0/100 | 267 | (I) | propylene(70/ butene-1(30) copolymer |

| | (C)/(D) Blend | | Adhesion Strength (g/cm) of (C)/(D) Blend | | | |
|---|---|---|---|---|---|---|
| | (C)/(D) | Ar—COO— group content (millimoles | to polyvinylidene chloride | | to polyethylene terephthalate | |
| Run No. | weight ratio | per 100 g of blend) | at 23° C. | at 80° C. | at 23° C. | at 80° C. |
| Example 41 | 100/0 | 559 | peeling impossible | 850 | peeling impossible | 750 |
| Example 42 | 50/50 | 280 | peeling impossible | 900 | peeling impossible | 950 |
| Example 43 | 30/70 | 168 | 2150 | 750 | 1800 | 800 |
| Example 44 | 30/70 | 168 | 2050 | 600 | 1850 | 500 |
| Example 45 | 100/0 | 263 | peeling impossible | 700 | 2000 | 480 |
| Example 46 | 5/50 | 131 | 2000 | 550 | 1700 | 600 |
| Comparative Example 3 | 100/0 | 267 | 1900 | 180 | 1450 | 150 |
| Comparative Example 4 | 50/50 | 134 | 1250 | 80 | 100 | 100 |

COMPARATIVE EXAMPLES 5 AND 6

A composition containing a block copolymer consisting of an ethylene/vinyl acetate copolymer and maleic anhydride-grafted polypropylene was synthesized in the same manner as described in Example 45 except that 450 g of acetyl chloride was used instead of benzoyl chloride.

The properties and adhesion strengths of this composition and a polymer blend containing this composition are shown in Table 7.

EXAMPLE 47

A polymer composition containing the block copolymer (C) shown in Table 7 was synthesized in the same manner as described in Example 41 except that maleic anhydride-grafted polyethylene (grafted maleic anhydride content=2.5% by weight, density=0.958 g/cm³, melt flow rate=0.7 g/10 min at 190° C.) was used instead of the maleic anhydride-grafted polypropylene used in Example 45, and this polymer composition (C) was diluted with high-pressure method polyethylene to form a blend. The adhesion strengths are shown in Table 7.

Incidentally, in this system, high density polyethylene ((η)=1.5 dl/g, density=0.96 g/cm³) was used as the polyolefin to be laminated with polyvinylidene chloride instead of the propylene/ethylene random copolymer.

EXAMPLE 48

A polymer composition-containing the block copolymer shown in Table 7 was prepared in the same manner as described in Example 45 except that cinnamoyl chloride was used instead of benzoyl chloride.

The composition was diluted as shown in Table 7. The adhesion strengths of the obtained blend are shown in Table 7.

EXAMPLE 49

A polymer composition-containing the block polymer shown in Table 7 was prepared in the same manner as described in Example 41 except that poly(2-hydroxyethyl acrylate) (number average molecular weight=13,000 as calculated as polystyrene and determined by GPC method) was used instead of the ethylene/vinyl alcohol copolymer used in Example 41.

Using the polymer composition, the blend shown in Table 7 was prepared, and the adhesion strengths of the resulting blend was measured. The obtained results are shown in Table 7.

EXAMPLE 50

A dry blend comprising 100 parts by weight of the ethylene/vinyl alcohol copolymer used in Example 45, 20 parts by weight of the maleic anhydride-grafted polypropylene used in Example 41 and 100 parts by weight of benzoic anhydride was prepared.

The dry blend was supplied to a 15 mm-diameter extruder maintained at 200° C. and extruded after a holding time of 4 minutes. Then, the extruded blend was further supplied to the same extruder 2 times, in order to make a total holding time (reaction time) become about 12 minutes. The prepared polymer composition was purified with acetone by using a Soxhlet extracter at the temperature of its boiling point for 8 hours. The properties of the polymer composition are shown in Table 7.

TABLE 7

| Composition Containing (A)-(B) Block ((C)) | | |
|---|---|---|
| | Ar—COO— group content | Polymer ((D)) |

TABLE 7-continued

| Run No. | structure of polymer chain (A) | structure of polymer chain (B) | (A)/(B) weight ratio | (millimoles per 100 g of (C)) | preparation (see the text) | Used for Dilution of (C) (molar ratio) |
|---|---|---|---|---|---|---|
| Comparative Example 5 | ‐(CH₂—CH)‐ \| CH₃ | ‐(CH₂—CH₂)‐(CH₂—CH)‐ \| O \| C=O \| CH₃ | 8.7/91.3 | 350 (CH₃COO—) | (I) | not diluted |
| Comparative Example 6 | " | " | 8.7/91.3 | 350 (CH₃COO—) | (I) | propylene (70)/ butene-1 (30) copolymer |
| Example 47 | ‐(CH₂—CH₂)‐ | ‐(CH₂—CH₂)‐(CH₂—CH)‐(CH₂—CH)‐ \| O \| C=O \| CH₃ ; O‐C=O‐Ph | 15.0/85.0 | 241 | (I) | high-pressure method polyethylene |
| Example 48 | ‐(CH₂—CH)‐ \| CH₃ | ‐(CH₂—CH₂)‐(CH₂—CH)‐(CH₂—CH)‐ \| O \| C=O \| CH₃ ; O‐C=O‐CH‐CH‐Ph | 6.5/93.5 | 245 | (I) | propylene (70)/ butene-1 (30) copolymer |
| Example 49 | ‐(CH₂—CH)‐ \| CH₃ | ‐(CH₂—CH)‐ \| C=O \| O—CH₂—CH₂—O—C(=O)—Ph | 5.4/94.6 | 422 | (I) | propylene (70)/ butene-1 (30) copolymer |
| Example 50 | ‐(CH₂—CH)‐ \| CH₃ | ‐(CH₂—CH₂)‐(CH₂—CH)‐(CH₂—CH)‐ \| O \| C=O \| CH₃ ; O‐C=O‐Ph | 12.1/87.9 | 245 | (II) | propylene (70)/ butene-1 (30) copolymer |

| | (C)/(D) Blend | | Adhesion Strength (g/cm) of (C)/(D) Blend | | | |
|---|---|---|---|---|---|---|
| | | | to polyvinyl chloride | | to polyethylene terephthalate | |
| Run No. | (C)/(D) weight ratio | Ar—COO— group content (millimoles per 100 g of blend) | at 23° C. | at 80° C. | at 23° C. | at 80° C. |
| Comparative Example 5 | 100/0 | 350 (CH₃COO—) | 500 | 10 | 80 | ~0 |
| Comparative Example 6 | 50/50 | 175 (CH₃COO—) | 70 | ~0 | ~0 | ~0 |
| Example 47 | 50/50 | 120 | 1500 | 650 | 1450 | 500 |
| Example 48 | 70/30 | 147 | 1700 | 550 | 1500 | 400 |
| Example 49 | 70/30 | 294 | peeling impossible | 750 | peeling impossible | 650 |
| Example 50 | 70/30 | 172 | 2000 | 600 | 1800 | 580 |

COMPARATIVE EXAMPLE 7

A dry blend comprising 100 parts by weight of the ethylene/vinyl alcohol copolymer used in Example 45 and 100 parts by weight of benzoil anhydride was prepared. And the polymer composition are shown in Table 8 was prepared from the dry blend using the same manner as described in Example 50.

The adhesion strenghts of a blend containing this polymer composition are shown in Table 8.

EXAMPLE 51

A dry blend of 100 parts by weight of a random copolymer (number average molecular weight=9,800 as calculated as polystyrene and determined by GPC method) comprising 21 mole % of 2-hydroxyethyl acrylate and 79 mole % of vinyl benzoate and 20 parts by weight of the maleic anhydride-grafted polypropylene used in Example 41, was supplied to a 15 mm-diameter extruded maintained at 200° C. and extruded after a holding time of about 3 minutes.

The properties and adhesion strengths of the product are shown in Table 8.

EXAMPLE 52

A polymer composition (C) was prepared in the same manner as described in Example 51 except that a random copolymer ($\overline{Mn}$=5,300, GPC method, polystyrene standard) consisting of 2-hydroxyethyl acrylate (25 mol %) and vinyl cinnamate (75 mol %) was used instead of the 2-hydroxyethyl acrylate/vinyl benzoate copolymer used in Example 51. The obtained results are shown in Table 8.

TABLE 9

| | | Adhesion Strength (g/cm) of Polymer Composition Used in Example 45 | |
|---|---|---|---|
| | | at 23° C. | at 80° C. |
| Example 53 | to polyvinyl chloride | 1800 | 800 |
| Example 54 | to vinyl chloride/vinyl acetate copolymer | 1850 | 900 |
| Example 55 | to polycarbonate | 1400 | 750 |
| Example 56 | to polyphenylene oxide | 1100 | 650 |
| Example 57 | to polystyrene | 950 | 600 |

TABLE 8

| | Composition Containing (A)-(B) Block ((C)) | | | | | |
|---|---|---|---|---|---|---|
| Run No. | structure of polymer chain (A) | structure of polymer chain (B) | (A)/(B) weight ratio | Ar—COO— group content (millimoles per 100 g of (C)) | preparation process (see the text) | Polymer ((D)) Used for Dilution of (C) (molar ratio) |
| Comparative Example 7 | not present | ‒(CH₂—CH₂)‒(CH₂—CH)‒(CH₂—CH)‒  with O-C(=O)-CH₃ and O-C(=O)-Ph | 0/100 | 275 | (II) | propylene (70) butene-1(3) copolymer |
| Example 51 | (CH₂—CH)—CH₃ | ‒(CH₂—CH)‒(CH₂—CH)‒ with C=O, O—CH₂—CH₂—CH and C=O-Ph | 16.2/83.8 | 468 | (III) | not diluted |
| Example 52 | (CH₂—CH)—CH₃ | ‒(CH₂—CH)‒(CH₂—CH)‒ with C=O, O—CH₂—CH₂—CH and C=O-CH=CH-Ph | 16.2/83.8 | 394 | (III) | not diluted |

| | (C)/(D) Blend | | Adhesion Strength (g/cm) of (C)/(D) Blend | | | |
|---|---|---|---|---|---|---|
| | | Ar—COO— group | to polyvinyl chloride | | to polyethylene terephthalate | |
| Run No. | (C)/(D) weight ratio | content (millimoles per 100 g of blend) | at 23° C. | at 80° C. | at 23° C. | at 80° C. |
| Comparative Example 7 | 70/30 | 193 | peeling impossible | 850 | 1800 | 650 |
| Example 51 | 100/0 | 468 | peeling impossible | 400 | peeling impossible | 350 |
| Example 52 | 100/0 | 394 | peeling impossible | 450 | peeling impossible | 450 |

EXAMPLES 53 THROUGH 57

The adhesion strengths of the polymer composition used in Example 45 to the various chlorine-containing or aromatic group-containing polymers used in Example 31 through 40 were measured in the same manner as used in Ex. 41, except that the resin temperature of chlorine-containing or aromatic group-containing polymers was changed as described in Example 31 through 40. The obtained results are shown in Table 9.

I claim:

1. An adhesive for joining together two polymers to form a laminated structure comprising (A) a first layer of polymer selected from the group consisting of a chlorine-containing polymer and an aromatic polymer, (B) a second layer selected from the group consisting of a chlorine-containing polymer, an aromatic polymer and a polyolefin with. (C) an adhesive layer therebetween, said adhesive comprising a modified olefin polymer composed of (a) a recurring monomer unit selected from the group consisting of ethylene and propylene, and
(b) a recurring monomer unit represented by following formula:

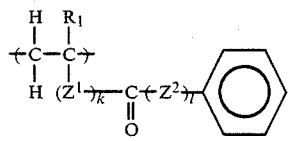

or

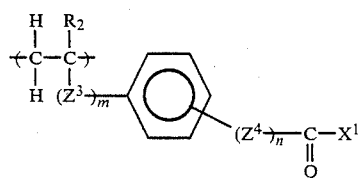

wherein $R_1$ and $R_2$ stand for a hydrogen atom or an alkyl group having up to 4 carbon atoms, each of k, l, m and n is 0 or 1, $Z^1$, $Z^2$, $Z^3$ and $Z^4$ stand for an oxygen atom or a divalent group comprising at least two elements selected from carbon, hydrogen, nitrogen and oxygen, $X^1$ stands for a monovalent group comprising at least two elements selected from carbon, hydrogen, nitrogen and oxygen or a blend of said modified olefin polymer with a polyolefin, wherein

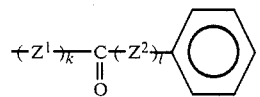

or

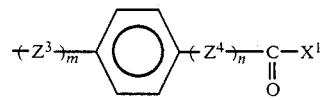

in said recurring monomer unit (b) is selected from the group consisting of

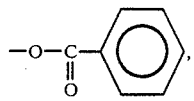

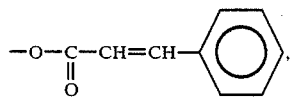

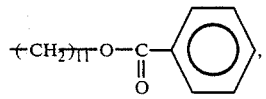

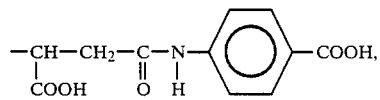

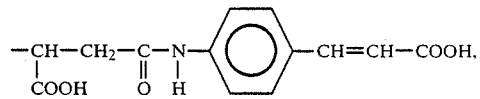

and

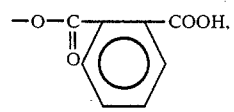

and is present at a concentration of 59 to 267 millimoles per 100 g of the polymer, and said polymer having an intrinsic viscosity ($\eta$) measured at 135° C. in decalin as a solvent of 0.7 to 4 dl/g.

2. An adhesive which comprises a benzoic acid-esterified ethylene/vinyl alcohol copolymer which is obtained by reacting an ethylene/vinyl alcohol copolymer with a benzoyl chloride, said benzoic acid-esterified copolymer having a benzoic ester group at a concentration of 59 to 267 millimoles per 100 g of the polymer and having an intrinsic viscosity ($\eta$) measured at 135° C. in decalin as a solvent of 0.7 to 4 dl/g.

* * * * *